US007810036B2

United States Patent
Bales et al.

(10) Patent No.: US 7,810,036 B2
(45) Date of Patent: Oct. 5, 2010

(54) SYSTEMS AND METHODS FOR PERSONALIZING A PORTAL

(75) Inventors: Christopher E. Bales, Boulder, CO (US); Jeffrey Mueller, Superior, CO (US); James Owen, Evergreen, CO (US); Jalpesh Patadia, Boulder, CO (US); Nathan Olson, Broomfield, CO (US); Manish Devgan, Broomfield, CO (US); Timothy Noonan, Broomfield, CO (US)

(73) Assignee: BEA Systems, Inc., Redwood Shores, CA (US)

(*) Notice: Subject to any disclaimer, the term of this patent is extended or adjusted under 35 U.S.C. 154(b) by 941 days.

(21) Appl. No.: 10/786,627

(22) Filed: Feb. 25, 2004

(65) Prior Publication Data

US 2004/0230947 A1 Nov. 18, 2004

Related U.S. Application Data

(60) Provisional application No. 60/451,174, filed on Feb. 28, 2003.

(51) Int. Cl.
G06F 3/00 (2006.01)
(52) U.S. Cl. .................. 715/742; 715/741; 709/201
(58) Field of Classification Search .............. 715/742, 715/741; 709/201
See application file for complete search history.

(56) References Cited

U.S. PATENT DOCUMENTS

| | | | |
|---|---|---|---|
| 5,173,939 A | 12/1992 | Abadi et al. ............ 380/25 |
| 5,237,614 A | 8/1993 | Weiss | |
| 5,347,653 A | 9/1994 | Flynn et al. | |
| 5,355,474 A | 10/1994 | Thuraisngham et al. | |
| 5,369,702 A | 11/1994 | Shanton ............. 713/166 |
| 5,426,747 A | 6/1995 | Weinreb et al. | |
| 5,481,700 A | 1/1996 | Thuraisingham ........ 395/600 |
| 5,544,322 A | 8/1996 | Cheng et al. | |
| 5,557,747 A | 9/1996 | Rogers et al. | |
| 5,627,886 A | 5/1997 | Bowman ............. 379/111 |
| 5,757,669 A | 5/1998 | Christie et al. | |

(Continued)

FOREIGN PATENT DOCUMENTS

EP 1 256 889 A 11/2002

(Continued)

OTHER PUBLICATIONS

Shirley Browne, et al., "Location-Independent Naming for Virtual Distributed Software Repositories"; http://portal.acm.org/dl.cfm, ACM Symposimn on Software Reusability, Seattle, WA,US, Aug. 1995, © 1995 AMC; vol. 20, Issue SI, pp. 179-185.

(Continued)

Primary Examiner—Weilun Lo
Assistant Examiner—Tuyetlien T Tran
(74) Attorney, Agent, or Firm—Fliesler Meyer LLP

(57) ABSTRACT

A system and method for configuring a portal, comprising providing a first user interface operable to define and/or manage the portal; providing a second user interface operable to define and/or manage personalization of the portal; and wherein the portal can include at least one of the following portal resources: a desktop, a book, a page, a portlet, a shell, a look and feel, and a layout.

39 Claims, 18 Drawing Sheets

U.S. PATENT DOCUMENTS

| | | | |
|---|---|---|---|
| 5,797,128 A | 8/1998 | Birnbaum | 707/5 |
| 5,801,702 A | 9/1998 | Dolan et al. | |
| 5,825,883 A | 10/1998 | Archibald et al. | |
| 5,826,000 A | 10/1998 | Hamilton | |
| 5,826,268 A | 10/1998 | Schaefer et al. | 707/9 |
| 5,848,396 A | 12/1998 | Gerace | 705/10 |
| 5,867,667 A | 2/1999 | Butman et al. | |
| 5,889,953 A | 3/1999 | Thebaut et al. | |
| 5,918,210 A | 6/1999 | Rosenthal et al. | |
| 5,950,195 A | 9/1999 | Stockwell et al. | |
| 5,954,798 A | 9/1999 | Shelton et al. | |
| 5,956,400 A | 9/1999 | Chaum et al. | |
| 5,966,707 A | 10/1999 | Van Huben et al. | |
| 5,987,469 A | 11/1999 | Lewis et al. | |
| 5,987,611 A | 11/1999 | Freund | |
| 5,991,877 A | 11/1999 | Luckenbaugh | 713/200 |
| 6,005,571 A | 12/1999 | Pachauri | 345/339 |
| 6,006,194 A | 12/1999 | Merel | |
| 6,029,144 A | 2/2000 | Barrett et al. | |
| 6,029,182 A | 2/2000 | Nehab et al. | 715/523 |
| 6,054,910 A | 4/2000 | Tada et al. | |
| 6,055,515 A | 4/2000 | Consentino et al. | |
| 6,055,637 A | 4/2000 | Hudson et al. | |
| 6,058,392 A | 5/2000 | Sampson et al. | |
| 6,083,276 A | 7/2000 | Davidson et al. | 717/1 |
| 6,098,173 A | 8/2000 | Elgressy et al. | |
| 6,108,687 A | 8/2000 | Craig | |
| 6,122,647 A | 9/2000 | Horowitz et al. | |
| 6,141,010 A | 10/2000 | Hoyle | 715/854 |
| 6,141,686 A | 10/2000 | Jackowski et al. | |
| 6,148,333 A | 11/2000 | Guedalia et al. | |
| 6,154,844 A | 11/2000 | Touboul et al. | |
| 6,157,924 A | 12/2000 | Austin | 707/10 |
| 6,158,010 A | 12/2000 | Moriconi et al. | |
| 6,167,407 A | 12/2000 | Nachenberg et al. | |
| 6,167,445 A | 12/2000 | Gai et al. | |
| 6,170,009 B1 | 1/2001 | Mandal et al. | |
| 6,182,226 B1 | 1/2001 | Reid et al. | 713/201 |
| 6,182,277 B1 | 1/2001 | DeGroot et al. | |
| 6,185,587 B1 * | 2/2001 | Bernardo et al. | 715/513 |
| 6,202,066 B1 * | 3/2001 | Barkley et al. | 707/9 |
| 6,202,157 B1 | 3/2001 | Brownlie et al. | |
| 6,202,207 B1 | 3/2001 | Donohue | |
| 6,209,101 B1 | 3/2001 | Mitchem et al. | |
| 6,216,231 B1 | 4/2001 | Stubblebine | |
| 6,226,745 B1 | 5/2001 | Wiederhold | 713/200 |
| 6,241,608 B1 | 6/2001 | Torango | 463/27 |
| 6,253,321 B1 | 6/2001 | Nikander et al. | |
| 6,260,050 B1 | 7/2001 | Yost et al. | 715/501.1 |
| 6,269,393 B1 | 7/2001 | Yost et al. | 709/201 |
| 6,269,456 B1 | 7/2001 | Hodges et al. | |
| 6,275,941 B1 | 8/2001 | Saito et al. | |
| 6,285,366 B1 | 9/2001 | Ng et al. | |
| 6,285,985 B1 | 9/2001 | Horstmann | 705/14 |
| 6,292,900 B1 | 9/2001 | Ngo et al. | |
| 6,295,607 B1 | 9/2001 | Johnson | |
| 6,301,613 B1 | 10/2001 | Ahlstrom et al. | |
| 6,308,163 B1 | 10/2001 | Du et al. | 705/8 |
| 6,317,868 B1 | 11/2001 | Grimm et al. | |
| 6,327,594 B1 | 12/2001 | Van Huben et al. | |
| 6,339,423 B1 | 1/2002 | Sampson et al. | |
| 6,339,826 B2 | 1/2002 | Hayes et al. | |
| 6,341,352 B1 | 1/2002 | Child et al. | |
| 6,353,886 B1 | 3/2002 | Howard et al. | |
| 6,360,363 B1 | 3/2002 | Moser et al. | |
| 6,377,973 B2 | 4/2002 | Gideon | |
| 6,381,579 B1 * | 4/2002 | Gervais et al. | 705/8 |
| 6,385,627 B1 | 5/2002 | Cragun | |
| 6,393,474 B1 | 5/2002 | Eichert et al. | |
| 6,397,222 B1 | 5/2002 | Zellweger | |
| 6,397,231 B1 | 5/2002 | Salisbury et al. | |
| 6,412,070 B1 | 6/2002 | Van Dyke et al. | |
| 6,412,077 B1 | 6/2002 | Roden et al. | |
| 6,418,448 B1 | 7/2002 | Sarkar | |
| 6,430,556 B1 | 8/2002 | Goldberg et al. | |
| 6,457,007 B1 | 9/2002 | Kikuchi et al. | |
| 6,460,141 B1 | 10/2002 | Olden | 713/201 |
| 6,466,239 B2 | 10/2002 | Ishikawa | |
| 6,473,791 B1 | 10/2002 | Al-Ghosein et al. | |
| 6,477,543 B1 | 11/2002 | Huang et al. | |
| 6,477,575 B1 | 11/2002 | Koepple et al. | |
| 6,484,177 B1 | 11/2002 | Van Huben et al. | |
| 6,484,261 B1 | 11/2002 | Wiegel | |
| 6,487,594 B1 | 11/2002 | Bahlmann | |
| 6,510,513 B1 | 1/2003 | Danieli | |
| 6,519,647 B1 | 2/2003 | Howard et al. | |
| 6,530,024 B1 | 3/2003 | Proctor | |
| 6,539,375 B2 | 3/2003 | Kawasaki | 707/5 |
| 6,571,247 B1 | 5/2003 | Danno et al. | 707/100 |
| 6,574,736 B1 | 6/2003 | Andrews | |
| 6,581,054 B1 | 6/2003 | Bogrett | |
| 6,581,071 B1 | 6/2003 | Gustman et al. | |
| 6,584,454 B1 | 6/2003 | Hummel, Jr. et al. | |
| 6,587,849 B1 | 7/2003 | Mason et al. | 707/5 |
| 6,587,876 B1 | 7/2003 | Mahon et al. | |
| 6,615,218 B2 | 9/2003 | Mandal et al. | |
| 6,618,806 B1 | 9/2003 | Brown et al. | |
| 6,633,538 B1 | 10/2003 | Tanaka et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,684,369 B1 | 1/2004 | Bernardo et al. | |
| 6,697,805 B1 | 2/2004 | Choquier et al. | |
| 6,721,888 B1 | 4/2004 | Liu et al. | |
| 6,732,144 B1 | 5/2004 | Kizu et al. | |
| 6,735,586 B2 | 5/2004 | Timmons | 707/3 |
| 6,735,701 B1 | 5/2004 | Jacobson | |
| 6,738,789 B2 | 5/2004 | Multer et al. | |
| 6,751,659 B1 | 6/2004 | Fenger et al. | |
| 6,754,672 B1 | 6/2004 | McLauchlin | 707/104.1 |
| 6,757,698 B2 | 6/2004 | McBride et al. | |
| 6,769,095 B1 | 7/2004 | Brassard et al. | |
| 6,769,118 B2 | 7/2004 | Garrison et al. | |
| 6,779,002 B1 | 8/2004 | Mwaura | |
| 6,789,202 B1 | 9/2004 | Ko et al. | |
| 6,834,284 B2 | 12/2004 | Acker et al. | |
| 6,856,999 B2 | 2/2005 | Flanagin et al. | |
| 6,857,012 B2 | 2/2005 | Sim et al. | |
| 6,865,549 B1 | 3/2005 | Connor | |
| 6,880,005 B1 | 4/2005 | Bell et al. | |
| 6,889,222 B1 | 5/2005 | Zhao | |
| 6,901,403 B1 | 5/2005 | Bata et al. | |
| 6,904,454 B2 | 6/2005 | Stickler | |
| 6,920,457 B2 | 7/2005 | Pressmar | |
| 6,922,695 B2 | 7/2005 | Skufca et al. | |
| 6,934,934 B1 | 8/2005 | Osborne, II et al. | |
| 6,957,261 B2 | 10/2005 | Lortz | |
| 6,961,897 B1 | 11/2005 | Peel et al. | |
| 6,965,999 B2 | 11/2005 | Fox et al. | |
| 6,970,876 B2 | 11/2005 | Hotti et al. | |
| 6,978,379 B1 | 12/2005 | Goh et al. | |
| 6,985,915 B2 | 1/2006 | Somalwar et al. | |
| 6,988,138 B1 * | 1/2006 | Alcorn et al. | 709/225 |
| 7,003,578 B2 | 2/2006 | Kanada et al. | |
| 7,035,879 B2 | 4/2006 | Shi et al. | |
| 7,035,944 B2 | 4/2006 | Fletcher et al. | |
| 7,047,522 B1 | 5/2006 | Dixon et al. | |
| 7,054,910 B1 | 5/2006 | Nordin et al. | |
| 7,062,490 B2 | 6/2006 | Adya et al. | |
| 7,062,511 B1 * | 6/2006 | Poulsen | 707/104.1 |
| 7,080,000 B1 | 7/2006 | Cambridge | |
| 7,085,755 B2 | 8/2006 | Bluhm et al. | |
| 7,089,584 B1 | 8/2006 | Sharma | |
| 7,093,200 B2 | 8/2006 | Schreiber et al. | |

| | | |
|---|---|---|
| 7,174,563 B1 | 2/2007 | Brownlie et al. |
| 7,185,192 B1 | 2/2007 | Kahn |
| 7,310,677 B1* | 12/2007 | Cohen et al. ................ 709/229 |
| 7,493,624 B1 | 2/2009 | Kautzleben et al. |
| 7,614,015 B2 | 11/2009 | Whalen et al. |
| 2001/0032128 A1 | 10/2001 | Kepecs |
| 2001/0034771 A1 | 10/2001 | Hutsch et al. |
| 2001/0047485 A1 | 11/2001 | Brown et al. |
| 2002/0005867 A1* | 1/2002 | Gvily .......................... 345/760 |
| 2002/0019827 A1 | 2/2002 | Shiman et al. |
| 2002/0029296 A1* | 3/2002 | Anuff et al. .................. 709/311 |
| 2002/0049961 A1* | 4/2002 | Fang et al. ................... 717/127 |
| 2002/0059394 A1 | 5/2002 | Sanders |
| 2002/0062451 A1 | 5/2002 | Scheidt et al. |
| 2002/0067370 A1* | 6/2002 | Forney et al. ............... 345/742 |
| 2002/0069261 A1 | 6/2002 | Bellare et al. ............... 709/218 |
| 2002/0087571 A1 | 7/2002 | Stapel et al. |
| 2002/0103818 A1 | 8/2002 | Amberden |
| 2002/0104071 A1 | 8/2002 | Charisius et al. |
| 2002/0107913 A1 | 8/2002 | Rivera et al. ................ 709/203 |
| 2002/0111998 A1 | 8/2002 | Kim |
| 2002/0112171 A1 | 8/2002 | Ginter et al. |
| 2002/0120685 A1 | 8/2002 | Srivastava et al. |
| 2002/0124053 A1 | 9/2002 | Adams et al. |
| 2002/0135617 A1 | 9/2002 | Samid |
| 2002/0143819 A1 | 10/2002 | Han et al. |
| 2002/0147645 A1 | 10/2002 | Alao et al. |
| 2002/0152267 A1 | 10/2002 | Lennon |
| 2002/0152279 A1 | 10/2002 | Sollenberger et al. |
| 2002/0161603 A1 | 10/2002 | Gonzales |
| 2002/0161903 A1 | 10/2002 | Besaw |
| 2002/0169893 A1 | 11/2002 | Chen et al. |
| 2002/0173971 A1 | 11/2002 | Stirpe et al. ..................... 705/1 |
| 2002/0178119 A1* | 11/2002 | Griffin et al. .................. 705/54 |
| 2002/0188869 A1 | 12/2002 | Patrick |
| 2002/0194267 A1* | 12/2002 | Flesner et al. ............... 709/203 |
| 2003/0014442 A1 | 1/2003 | Shiigi et al. |
| 2003/0032409 A1 | 2/2003 | Hutcheson et al. |
| 2003/0046576 A1 | 3/2003 | High et al. |
| 2003/0056026 A1 | 3/2003 | Anuff et al. |
| 2003/0065721 A1 | 4/2003 | Roskind |
| 2003/0069766 A1 | 4/2003 | Hoffman et al. |
| 2003/0078972 A1 | 4/2003 | Tapissier et al. |
| 2003/0088617 A1 | 5/2003 | Clark et al. |
| 2003/0110448 A1 | 6/2003 | Haut et al. |
| 2003/0120686 A1 | 6/2003 | Kim et al. |
| 2003/0126464 A1 | 7/2003 | McDaniel et al. |
| 2003/0126558 A1* | 7/2003 | Griffin .......................... 715/513 |
| 2003/0131113 A1 | 7/2003 | Reeves et al. ............... 709/229 |
| 2003/0135490 A1 | 7/2003 | Barrett et al. |
| 2003/0140308 A1 | 7/2003 | Murthy et al. |
| 2003/0146937 A1 | 8/2003 | Lee |
| 2003/0167315 A1* | 9/2003 | Chowdhry et al. .......... 709/218 |
| 2003/0167455 A1 | 9/2003 | Iborra et al. |
| 2003/0187956 A1 | 10/2003 | Belt et al. |
| 2003/0204481 A1 | 10/2003 | Lau |
| 2003/0212766 A1* | 11/2003 | Giles et al. .................. 709/219 |
| 2003/0216938 A1 | 11/2003 | Shour |
| 2003/0220913 A1 | 11/2003 | Doganata et al. |
| 2003/0220963 A1 | 11/2003 | Golovinsky et al. |
| 2003/0229623 A1 | 12/2003 | Chang et al. ..................... 707/3 |
| 2004/0003071 A1 | 1/2004 | Mathew et al. |
| 2004/0003347 A1* | 1/2004 | Saidenberg et al. ......... 715/511 |
| 2004/0019650 A1 | 1/2004 | Auvenshine |
| 2004/0024812 A1 | 2/2004 | Park et al. |
| 2004/0030744 A1* | 2/2004 | Rubin et al. ................. 709/203 |
| 2004/0030795 A1* | 2/2004 | Hesmer et al. .............. 709/231 |
| 2004/0078371 A1* | 4/2004 | Worrall et al. ................... 707/9 |
| 2004/0098467 A1* | 5/2004 | Dewey et al. ............... 709/219 |
| 2004/0167880 A1 | 8/2004 | Smith |
| 2004/0167899 A1 | 8/2004 | Patadia et al. |
| 2004/0205473 A1* | 10/2004 | Fisher et al. ................. 715/500 |
| 2004/0205557 A1 | 10/2004 | Bahrs et al. |
| 2004/0230546 A1 | 11/2004 | Rogers |
| 2004/0243824 A1 | 12/2004 | Jones |
| 2004/0254884 A1* | 12/2004 | Haber et al. ................... 705/51 |
| 2005/0021502 A1 | 1/2005 | Chen et al. |
| 2005/0050184 A1 | 3/2005 | Boden et al. |
| 2005/0060324 A1 | 3/2005 | Johnson et al. |
| 2005/0076311 A1* | 4/2005 | Kusterer et al. ............. 715/853 |
| 2005/0086206 A1 | 4/2005 | Balasubramanian et al. |
| 2005/0097008 A1 | 5/2005 | Ehring et al. |
| 2005/0198617 A1 | 9/2005 | Kim et al. |
| 2006/0059107 A1 | 3/2006 | Elmore et al. |
| 2006/0085412 A1 | 4/2006 | Johnson et al. |
| 2006/0122882 A1 | 6/2006 | Brown et al. |
| 2007/0083484 A1 | 4/2007 | McVeigh et al. |

FOREIGN PATENT DOCUMENTS

| | | |
|---|---|---|
| WO | WO0114962 A1 | 3/2001 |
| WO | WO 01/67285 A | 9/2001 |

OTHER PUBLICATIONS

Christina Catley, et al., "Design of a Health Care Architecture for Medical Data Interoperability and Application Integration"; Proceedings of the Second Joint EMBS/BMES Conference, Houston, TX, USA; Oct. 23-26, 2002; IEEE, vol. 3, pp. 1952-1953.

Sundsted, Todd, "JNDI Overview, Part 1: An Introduction to Naming Services", JavaWorld, Jan. 2000. pp. 1-6, (downloaded from: www.javaworld.com/javaworld/jw-01-2000/jw-01-howto_p. html.).

Moore, Bill, et al., "Migrating Weblogic Applications to WebSphere Advanced Edition", IBM Redbooks, Jan. 2001, pp. 1, 3-4, 109-111 and 181-195.

Barrett, Alexandra, "Trying Out Transactions", SunExpert Magazine, Jan. 1999, pp. 57-59.

Ayers, Danny, et al., Professional Java Server Programming, Wrox Press, Ltd., Birmingham, UK, Dec. 1999, pp. 515-545.

Ford, Nigel, Web Developer.com Guide to Building Intelligent Web Sites with JavaScript, Wiley Computer Publishing, NY, NY © 1998, pp. 65-86, 96-98, 101-102, 245-250 and 324-327.

Microsoft Computer Dictionary, 4th Edition, Microsoft Press, Redmond, WA,© 1999, p. 489.

Gediminas Adomavicius, et al., "User Profiling in Personalization Applications Through Rule Discovery and Validation", KDD '99, San Diego CA © 1999 ACM, pp. 377-381.

Ibrahim Cingil, et al., "A Broader Approach to Personalization"; Communications of the ACM, vol. 43, No. 6, Aug. 2000; pp. 136-141.

Constantine Stephanidis, et al., "Decision Making in Intelligent User Interfaces", IUI '97, Orlando, FL, © 1997 ACM, pp. 195-202.

Oliver Stiemerling, et al., "How to Make Software Softer—Designing Tailorable Applications", DIS '97, Amsterdam, The Netherlands, © ACM 1997, pp. 365-376.

Eric Freudenthal, et al., "dRBAC: Distributed Role-based Access Control for Dynamic Coalition Environments", Proceedings of the 22nd International Conference on Distributed Computing Systems (ICDCS '02), IEEE 2002, 10 pages.

Zheng Zhang, et al., "Designing a Robust Namespace for Distributed File Services", Reliable Distributed System, 2001. Proceedings, 20th IEEE Symposium on Oct. 28-31, 2001, pp. 162-171.

Atul Adya, et al., "FARSITE: Federated, Available and Reliable Storage for an Incompletely Trusted Environment", ACM SIGOPS Operating Systems Review, vol. 36, Issue SI (Winter 2002). OSDI '02: Proceedings of the 5th Symposium on Operating Systems Design and Implementation, pp. 1-14.

Thomas Kistler, et al., "WebL- A Programming Language for the Web"; Computer Networks and ISDN Systems, Published by Elsevier Science B.V.; North Holland Publishing, Amsterdam, NL; vol. 30, No. 1-7; Apr. 1998; pp. 259-270.

Michael R. Levy, "Web Programming in Guide"; Software Practice & Experience, Wiley and Sons; Bognor Regis, GB; vol. 28; No. 15; Dec. 25, 1998; pp. 1581-1603.

David L. Atkins, et al., "Mawl: A Domain-specific Language for Form-based Services"; IEEE Transactions on Software Engineering; IEEE Service Center, Los Almitos, CA, US; vol. 25, No. 3; May 1999; pp. 334-346.

T. Howes, "The String Representation of LDAP Search Filters"; Dec. 1997 (RFC 2254); © The Internet Society (1997); pp. 1-8.

Supplementary European Search Report; Application No. 01975484.5; dated Dec. 12, 2006; Received Jan. 10, 2007; 2 pages.

C.W. Symborski, "Updating Software and Configuration Data in a Distributed Communications Network"; Computer Networking Symposium, 1988; pp. 331-338.

"USDataCenter Chooses Baltimore SelectAccess to Enable Next generation Security Solutions for eBusiness"; Business Wire, P2079, Apr. 4, 2001; Newswire; Trade; pp. 2.

Eiji Okamoto, "Proposal for Integrated Security Systems", Jun. 1992, IEEE Computer Society Press, p. 354-358.

http://java.sun.com/products/ejb/ (last visit: Dec. 7, 2004).

http://www.javaworld.com/jw-12-2002/jw-1207-yesnoejb_p.html (last visit: Dec. 7, 2004).

Candan, et al., "Enabling Dynamic Content Caching for Database-Driven Web Sites", Proceedings of the 2001 ACM SIGMOND International Conference on Management of Data, Santa Barbara, California, USA, May 21-24, 2001, pp. 532-543.

Tanyi, E. "Easy XML", Mar. 6, 2000, pp. 1-6, www.winsite.com.

IBM, "Method and System for Visually Constructing Document Type Definitions and Related Artifacts Using a Reusable Object Model", Technical Disclosure Bulletin, May 23, 2001, 3 pages, IP.com.

Parker, E. "The Complete Idiots Guide to Microsoft FrontPage 2000", 1999, pp. 7 and 55, QUE.

Rossi, et al., "Designing Personalized Web Applications", May 1-5, 2001, pp. 275-284, WWW 10, Hong Kong, ACM.

Lee et al., "Keeping Virtual Information Resources Up and Running", Nov. 1997, IBM Press, pp. 1-14.

Hayton, R.J. et al., "Access Control in an Open Distributed Environment," 1998 Proceedings of the IEEE Symposium on Security & Privacy, May 3-6, 1998, Oakland, California, USA, 12 pages.

Bertino, Elisa et al., "TRBAC: A Temporal Role-Based Access Control Model," ACM Transactions on Information and System Security (TISSEC), vol. 4, Issue 3 (Aug. 2001), pp. 191-223.

Sandhu, Ravi S. et al., "Role-Based Access Control Models," IEEE Computer, vol. 29, No. 2, Feb. 1996, pp. 38-47.

Covington, Michael J. et al., "Securing Context-Aware Applications Using Environment Roles," ACM Workshop on Role Based Access Control, Proceedings of the Sixth ACM Symposium on Access Control Models and Technologies, SACMAT '01, May 3-4, 2001, Chantilly, Virginia, USA, pp. 10-20.

Yao, Walt et al., "A Model of OASIS Role-Based Access Control and Its Support for Active Security," ACM Workshop on Role Based Access Control, Proceedings of the Sixth ACM Symposium on Access Control Models and Technologies, SACMAT '01, May 3-4, 2001, Chantilly, Virginia, USA, pp. 171-181.

Georgiadis, Christos K. et al., "Flexible Team-Based Access Control Using Contexts," ACM Workshop on Role Based Access Control, Proceedings of the Sixth ACM Symposium on Access Control Models and Technologies, SACMAT '01, May 3-4, 2001, Chantilly, Virginia, USA, pp. 21-27.

Tzelepi, Sofia K. et al., "A Flexible Content and Context-Based Access Control Model for Multimedia Medical Image Database Systems," International Multimedia Conference; Proceedings of the 2001 ACM Workshop on Multimedia and Security: New Challenges, Oct. 5, 2001, pp. 52-55.

Goh, Chen et al., "Towards a More Complete Model of Role," Symposium on Access Control Models and Technologies, Proceedings of the Third ACM Workshop on Role-Based Access Control, 1998, Fairfax, Virginia, USA, pp. 55-61.

Microsoft Windows ("Windows Exploer"), copyright © 1981-2001, 3 pages.

Cohen, "LDAP 101: Glue Your Network's Pieces Toghether, Aug. 12, 2002, Enterprising Networking Planet", http://www.enterprisenetworkingplanet.com/netsp/article.php/1444871, 8 pages.

* cited by examiner

SYSTEMS AND METHODS FOR PERSONALIZING A PORTAL

CLAIM OF PRIORITY

This application claims priority from the following application, which is hereby incorporated by reference in its entirety:

SYSTEMS AND METHODS FOR PORTAL AND WEB SERVER ADMINISTRATION, U.S. Application No. 60/451,174, Inventors: Christopher E. Bales, et al., filed on Feb. 28, 2003.

CROSS-REFERENCE TO RELATED APPLICATIONS

This application is related to the following co-pending applications which are hereby incorporated by reference in their entirety:

SYSTEMS AND METHODS FOR PORTAL AND WEB SERVER ADMINISTRATION, U.S. application Ser. No. 10/786,742, Inventors: Christopher E. Bales, et al., filed on Feb. 25, 2004.

SYSTEMS AND METHODS FOR NAVIGATING A GRAPHICAL HIERARCHY, U.S. application Ser. No. 10/786,749, Inventors: Christopher E. Bales, et al., filed on Feb. 25, 2004.

SYSTEMS AND METHODS FOR CONTEXT-SENSITIVE EDITING, U.S. application Ser. No. 10/786,752, Inventors: Christopher E. Bales, et al., filed on Feb. 25, 2004.

SYSTEMS AND METHODS FOR AN EXTENSIBLE ADMINISTRATION TOOL, U.S. application Ser. No. 10/786,761, Inventors: Richard Mousseau, filed on Feb. 25, 2004.

CONTENT MINING FOR VIRTUAL CONTENT REPOSITORIES, U.S. application Ser. No. 10/772,625, Inventors: Gregory Smith, et al., filed on Feb. 5, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to systems and methods for portal and web server administration.

BACKGROUND

Resources within web/application servers are many and varied (e.g., threads, servlets, roles, object pools, containers, etc.). However, conventional tools for performing administration and management of network accessible resources are often concerned with a gross level of detail. Such systems do not provide the types and extent of information desired by web/application server system administrators.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In one embodiment, a user interface provides a means for a user to interact with one or more processes that are operable to configure and manage portals and/or web servers. By way of a non-limiting example, a user interface can include one or more of the following: 1) a graphical user interface (GUI); 2) an ability to respond to sounds and/or voice commands; 3) an ability to respond to input from a remote control device (e.g., a cellular telephone, a personal digital assistant, or other suitable remote control); 4) an ability to respond to gestures (e.g., facial and otherwise); 5) an ability to respond to commands from a process on the same or another computing device; and 6) an ability to respond to input from a computer mouse and/or keyboard. This disclosure is not limited to any particular user interface. Those of skill in the art will recognize that many other user interface embodiments are possible and fully within the scope and spirit of this disclosure.

Figure 1:
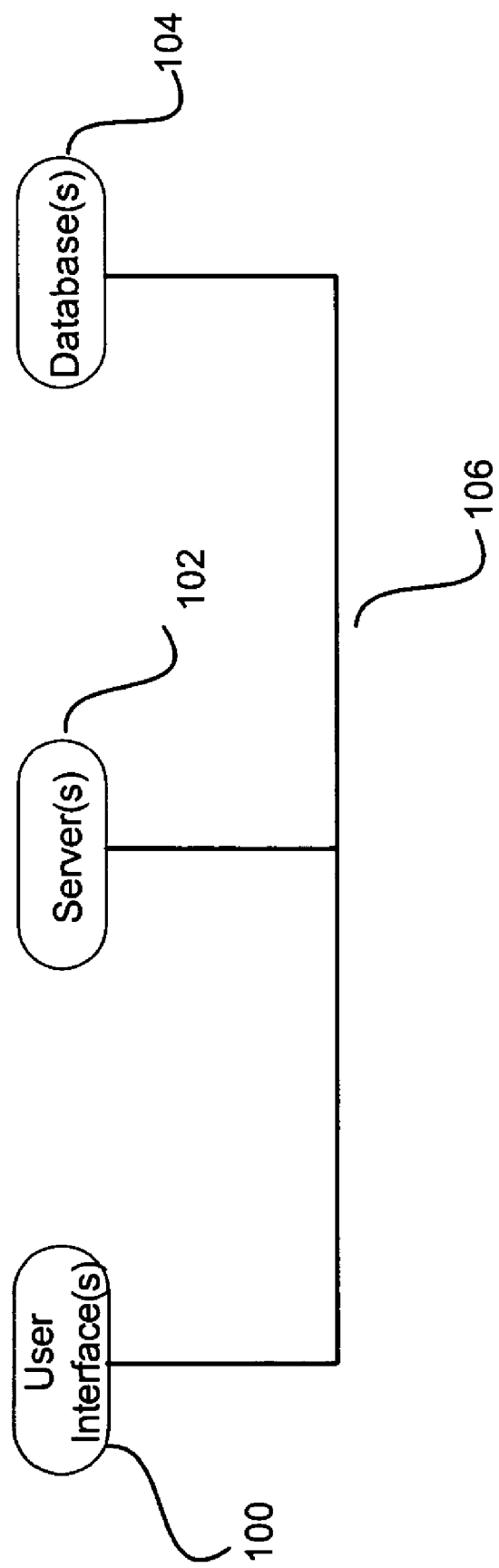
FIG. 1 is an illustration of an administration system in an embodiment.

FIG. 1 is an illustration of an administration system in an embodiment. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

In one embodiment and by way of a non-limiting example, the system can include a collection of administration user interfaces 100, one or more web/application servers 102, and one or more databases 104, connected by one or more networks 106 or other suitable communication means. A network can include but is not limited to: public and/or private networks, wireless networks, optical networks, and satellite based communication links. Other suitable communication means can include but is not limited to: random access memory, file system(s), distributed objects, persistent storage, and inter-processor communication networks. The WebLogic® Server, available from BEA Systems, Inc., is a suitable web/application server in one embodiment. The one or more databases can include but is not limited to: relational databases, object-oriented databases, file systems, or any other kind of persistent storage.

Figure 2:
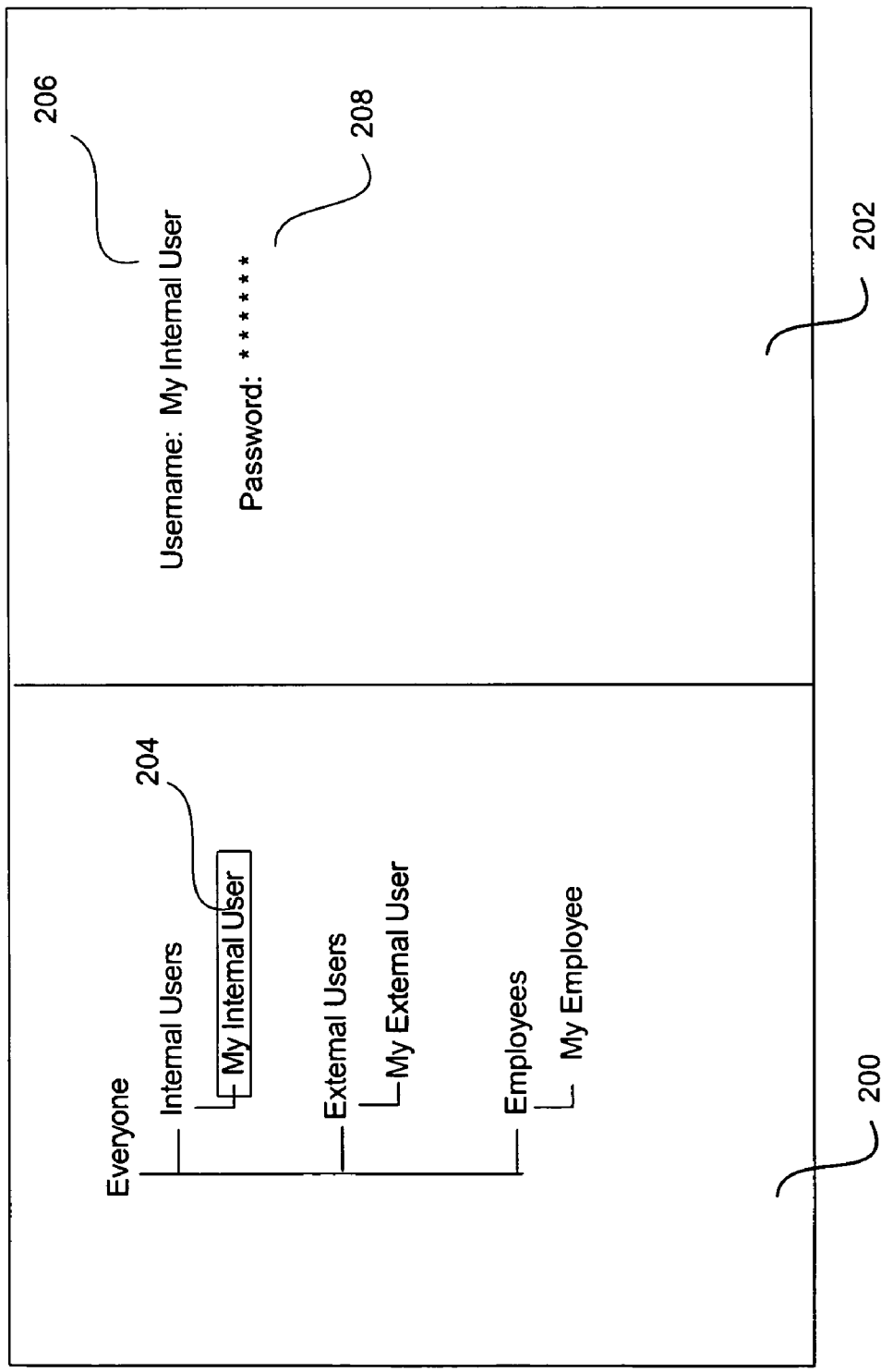
FIG. 2 is an illustration of a user interface that can be used to create and manage portal users and groups in an embodiment.

FIG. 2 is an illustration of a user interface that can be used to create and manage portal users and groups in an embodiment. By way of a non-limiting example, a user interface can be implemented using software such as X Windows or Microsoft® Windows. In one embodiment, a user interface can include two graphical components that can work together: an optional hierarchy browser 200 and a context-sensitive editor 202. The hierarchy browser can render information such that hierarchical relationships between objects are apparent from the indentation of an object relative to other objects. For example, the object represented by the text "Everyone" is the root of the hierarchy. Its immediate children are "InternalUsers", "ExternalUsers" and "Employees". These children share "Everyone" as their parent. "InternalUsers" has one child, "MyInternalUser". Likewise, the parent of "MyInternalUser" is "InternalUsers". By way of a non-limiting example, selecting an object in the hierarchy browser can invoke a context-sensitive editor appropriate for editing the object. The rectangle 204 surrounding the object "MyInternalUser" indicates that this object has been selected. In one embodiment, objects can be manipulated (e.g., dragged and dropped) in the browser, thus allowing a user to easily rearrange the hierarchy.

In one embodiment, new groups can be created and nested within existing groups. For example, the global group "Everyone" has three nested groups: "Internal Users", "External Users" and "Employees". Although not shown in FIG. 2, nested groups can also contain nested groups. Groups can be nested without limit. A group can contain zero or more nested groups and zero or more users. A user can belong to zero or more groups. Child groups are considered to fulfill the group membership of their parents. Although the present disclosure is not limited to any particular user interface or method of user interaction, in one embodiment new groups can be created within an existing group by right-clicking a mouse on the group (e.g., "Everyone", "InternalUsers", "ExternalUsers", or "Employees") and selecting an "Add Group" menu option (not shown). Users can be created in the same way by right-clicking a mouse on the group and selecting "Add New User". FIG. 2 illustrates a context sensitive editor for the user "MyInternalUser" which belongs to the group "InternalUsers". The name can be modified and password associated with this user can be modified via input fields 206 and 208, respectively.

Figure 3:
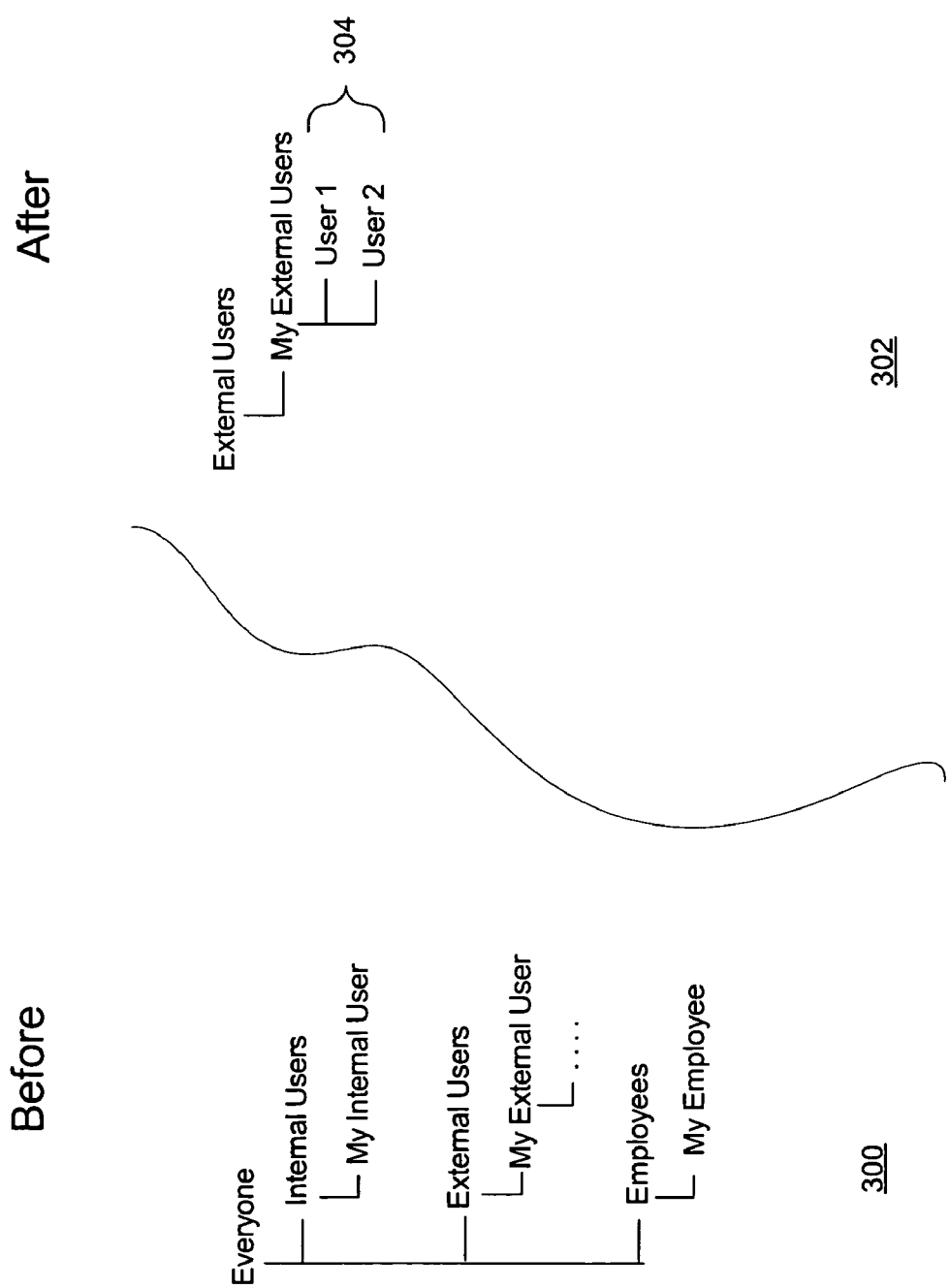
FIG. 3 is an illustration of a hierarchy browser zoom feature in an embodiment.

FIG. 3 is an illustration of a hierarchy browser zoom feature in an embodiment. In one embodiment, a "zoom" feature can be used to render a view of a hierarchy in a hierarchy browser with a root object other than the absolute root of the hierarchy. For example, the root of hierarchy 300 is the "Everyone" object. In one embodiment, a new object can be selected by the user such that the hierarchy is rendered with the new object as the root. For example, if "ExternalUsers" were chosen as the new root, the hierarchy can be rendered as in 302. By zooming in, additional 304 objects can come into view that may have been clipped in the original rendering. In addition, the zoom feature can be used recursively such that a user can zoom in repeatedly. In one embodiment, a user can zoom in on an object by selecting it in some fashion (e.g., via a mouse click, a menu selection, keyboard input, etc.). A user can also "pop" or un-zoom zoomed views until the original view is visible. In one embodiment, popping a zoomed view can be accomplished through user interaction with the user interface (e.g., via a mouse click, a menu selection, keyboard input, etc.).

In addition to creating and managing users and user groups, the system can be used to create portals. A portal provides a way to aggregate content and integrate applications, allowing a visitor to a Web site to access everything via a user interface. Portals can be composed of a collection of portlets, each of which typically presents an application. Portlets are arranged on pages, which in turn are part of a book. These components are on the main body of the portal, which can also include a header and footer as part of the shell. The way that the portal is displayed and how it behaves is determined by the look and feel. It is this collection of components that makes up a portal. In one embodiment, a desktop can be a specific view of a portal, allowing for variations based on the characteristics of a visitor to a site. Thus, a desktop is a portal. For example, an employee and a customer might both visit a particular portal, but each can be directed to the appropriate desktop. Each desktop can have a distinct look and feel, organization of books and pages, and set of available portlets. Further control over the available resources is accomplished with Visitor Entitlements. The system allows users to create and configure all of these components.

Figure 4:
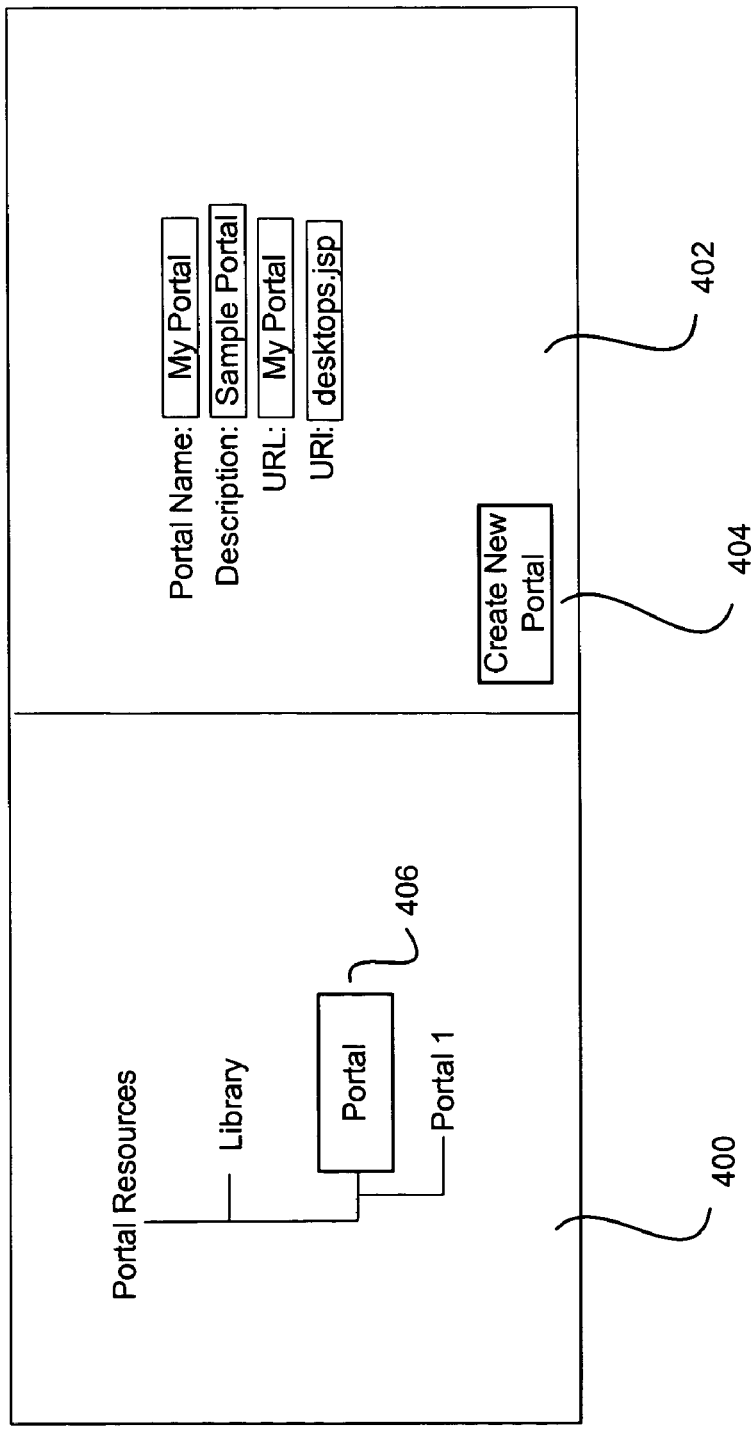
FIG. 4 is an illustration of a user interface that can be used to create and manage portals in an embodiment.
Figure 5:
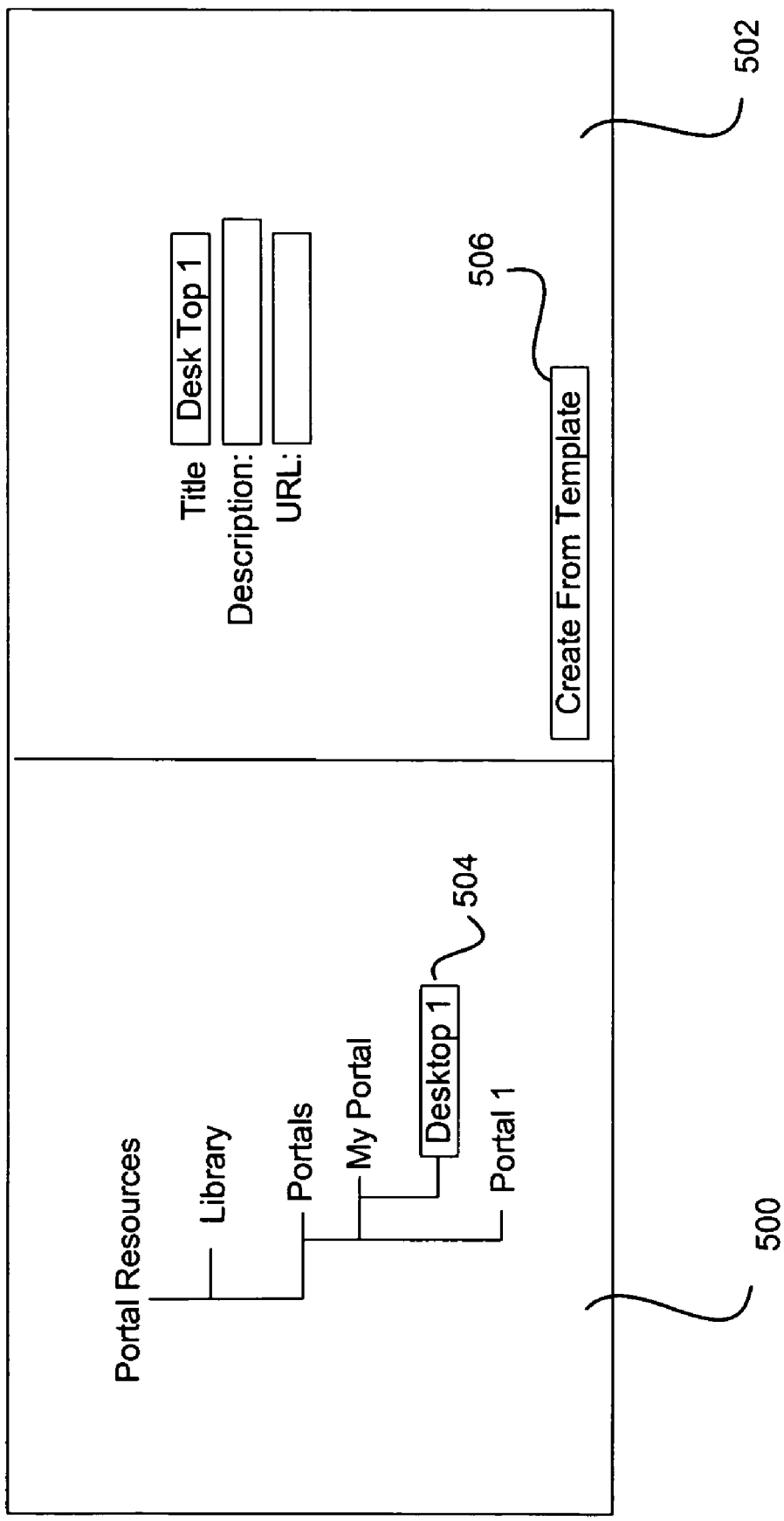
FIG. 5 is an illustration of a user interface that can be used to create and manage portal desktops in an embodiment.

FIG. 4 is an illustration of a user interface that can be used to create and manage portals in an embodiment. By way of non-limiting example, the hierarchal browser 400 presents a view of a portal resources or components tree. The "Portals" object represents the root of a portal subtree and is not itself a portal. In this example, the "Portals" object has one child, a portal named "Portal 1". The rectangle 406 surrounding the "Portals" object indicates that it has been selected. Context-sensitive editor 402 allows a user to create and modify portals selected in the tree. Since a root portal object has been selected (and not a particular portal), the editor allows a new portal to be defined. Had "Portal 1" been selected, a user would be able to edit its properties. New portals can be created hierarchically below the "Portals" object at the level of the "Portal 1" object. After entering property information into the editor, the "Create New Portal" button 404 can be selected to create the portal. In this example, a new portal named "MyPortal" is being defined. After the button 404 has been selected, the new portal can appear in the portal subtree as shown in FIG. 5 below. The new portal can also include a textual description, uniform resource locator (URL) and a universal resource identifier (URI). It will be evident to those of skill in the art, and within the scope and spirit of this disclosure, that any properties serving any purpose can be associated with a portal.

FIG. 5 is an illustration of a user interface that can be used to create and manage portal desktops in an embodiment. Desktops provide user-specific views of portals. Desktops are related to each when they are part of the same portal, but they can be distinct in terms of their look and feel and their portal resources/components. Desktops provide an easy way for administrators to target specific users based on users' identity, group membership, or profile. Entitlements can be set on a desktop that allow them to be used by specific users or groups. By way of a non-limiting example, FIG. 5 shows that "My Portal" and "Portal 1" are direct children of the "Portals" object as shown in browser 500. A desktop "Desktop 1" has been added to the portal "MyPortal". This can be accomplished any number of ways, including but not limited to right-clicking a mouse on "MyPortal" and selecting "Create new desktop" from a pop-up menu.

FIG. 5 illustrates that "Desktop 1" has been selected 504. As such, context-sensitive editor 502 allows its properties to be changed. In one embodiment, properties can include: title, description and URL. It will be evident to those of skill in the art than many more properties can be associated with a desktop and still be within the scope and spirit of the present disclosure. Desktop resources can be automatically created for the desktop from a template. A template provides a way to create new desktops that are pre-configured with portal resources/components that are ready for use. Templates are useful as the starting point for portal applications, allowing for the rapid deployment of new desktops in a portal. By selecting the "Create from Template" button 506, a user can choose a template to apply to the desktop. In one embodiment, templates can include descriptive information to assist the user in making a selection.

Figure 6:
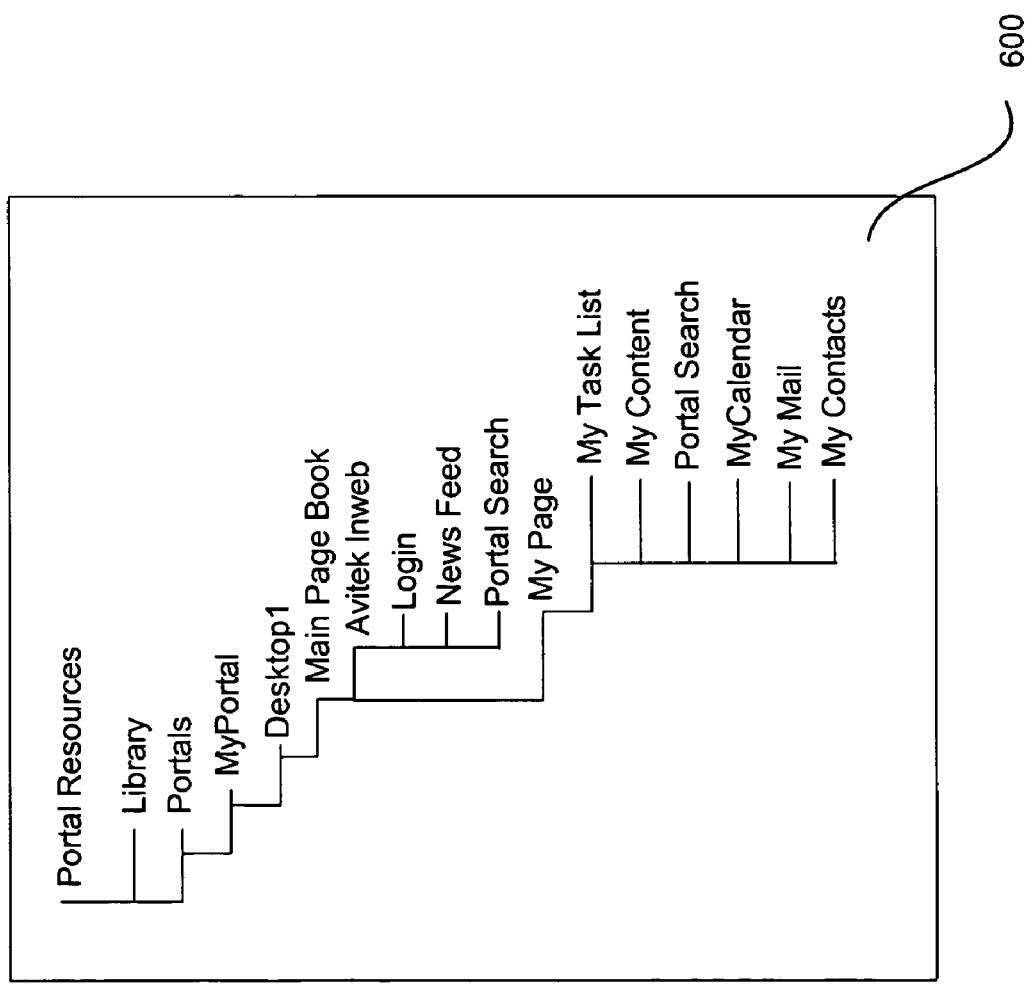
FIG. 6 is an illustration of desktop resource/component hierarchy that has been created with a template.

FIG. 6 is an illustration of desktop resource/component hierarchy that has been created with a template. "Desktop 1" in optional hierarchy browser 600 has a book ("Main Page Book") which includes two pages ("Avitek Inweb", "My Page"). Each page includes a number of portlets. The "Avitek Inweb" page includes the following portlets which are represented graphically as children of the page: "Login", "News Feed" and "Portal Search". The "My Page" page includes the following portlets: "My Task List", "My Content", "Portal Search", "My Mail" and "My Contacts". To preview the new desktop in a browser, a user can right click Desktop1, and select "View Desktop" from a popup menu (not shown). When the portal is rendered (e.g., when viewed in a web browser), the book control corresponding to "Main Page Book" will allow the visitor to navigate to each page. When a page is rendered, its portlets will be rendered subject to entitlement restrictions, if any.

Portal resources can be associated with a desktop manually, rather than through the use of a template. In one embodiment and by way of a non-limiting illustration, resources from other parts of the resource hierarchy can be dragged and dropped (i.e. moved or copied) individually or in groups onto a desktop object in a hierarchy browser, thereby associating them with the desktop. Desktop resources can include portlets, books, pages, look and feels, shells, layouts, and other suitable resources. A page provides a way to organize portlets into groups based on related content, similar tasks, or simply user preference. Non-limiting examples include a human resources page that contains company-specific portlets, a finance page that includes banking and portfolio portlets, and a personal page that includes frequently accessed portlets. In one embodiment, a user can create a new page by selecting a book in a hierarchy browser and then selecting a "Create New Page" button in the corresponding context-sensitive editor. The new page will appear in the hierarchical view beneath the book. The page can then be selected and edited with the page context-sensitive editor. In addition, the book editor allows the book's pages to be ordered for presentation purposes at render time. By way of a non-limiting example, the following properties can be specified for a page: layout, locale, title, theme, portlets, entitlements and description.

Figure 7:
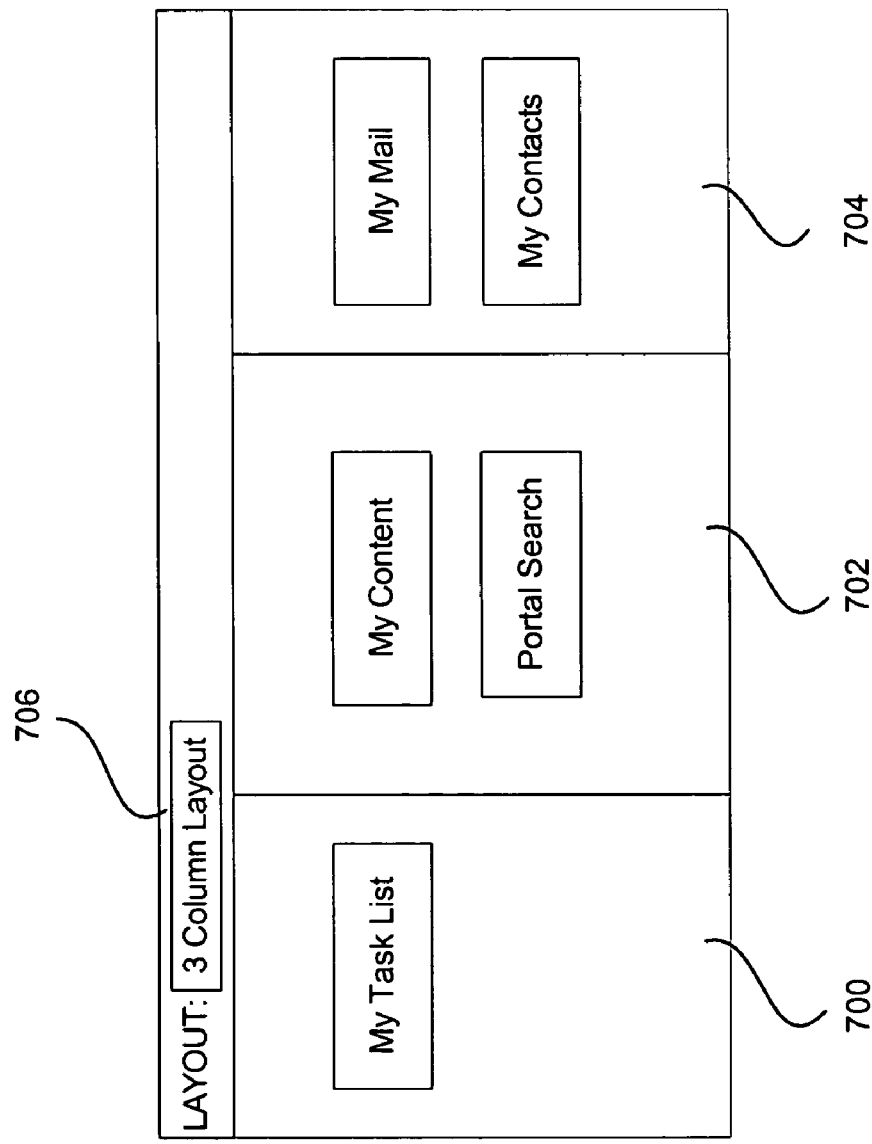
FIG. 7 is an illustration of page layout context-sensitive editor in an embodiment.

FIG. 7 is an illustration of page layout context-sensitive editor in an embodiment. In one embodiment, a user can determine the overall layout of a portal page and the position of portlets on the page. The illustrated layout style in this example—"three column layout"—is indicated by pull-down menu 706. The three columns are 700, 702 and 704. Other layouts are possible (e.g., two-column, grid, etc.) and are available from the pull-down menu. A user can dynamically switch between any layout, regardless of how the portlets are presently arranged, by selecting a layout from the menu. A rectangle representing the display area of "My Task List" portlet is displayed in column 700. Column 702 contains portlets "My Content" and "Portal Search". Column 704 contains portlets "My Mail" and "My Contacts". Each rectangle representing the display area of a portlet can be resized larger or smaller to thereby increase or decrease its display area. In addition, the portlet rectangles can be moved between columns and rearranged within columns by dragging and dropping.

Visitor entitlements (or entitlements) can control access to portal application resources/components such as portlets, pages, and desktops. Entitlements can be set in a library or in portal applications. Entitlements can use roles and security policies to control access to resources. Roles dynamically group users based on username, group membership, profile, session and request attributes, and/or an assortment of date and time functions. Security policies determine what capabilities for a given resource are available to a given role. Entitlement capabilities can differ by resource and can include view, minimize, maximize, and edit.

Figure 8:
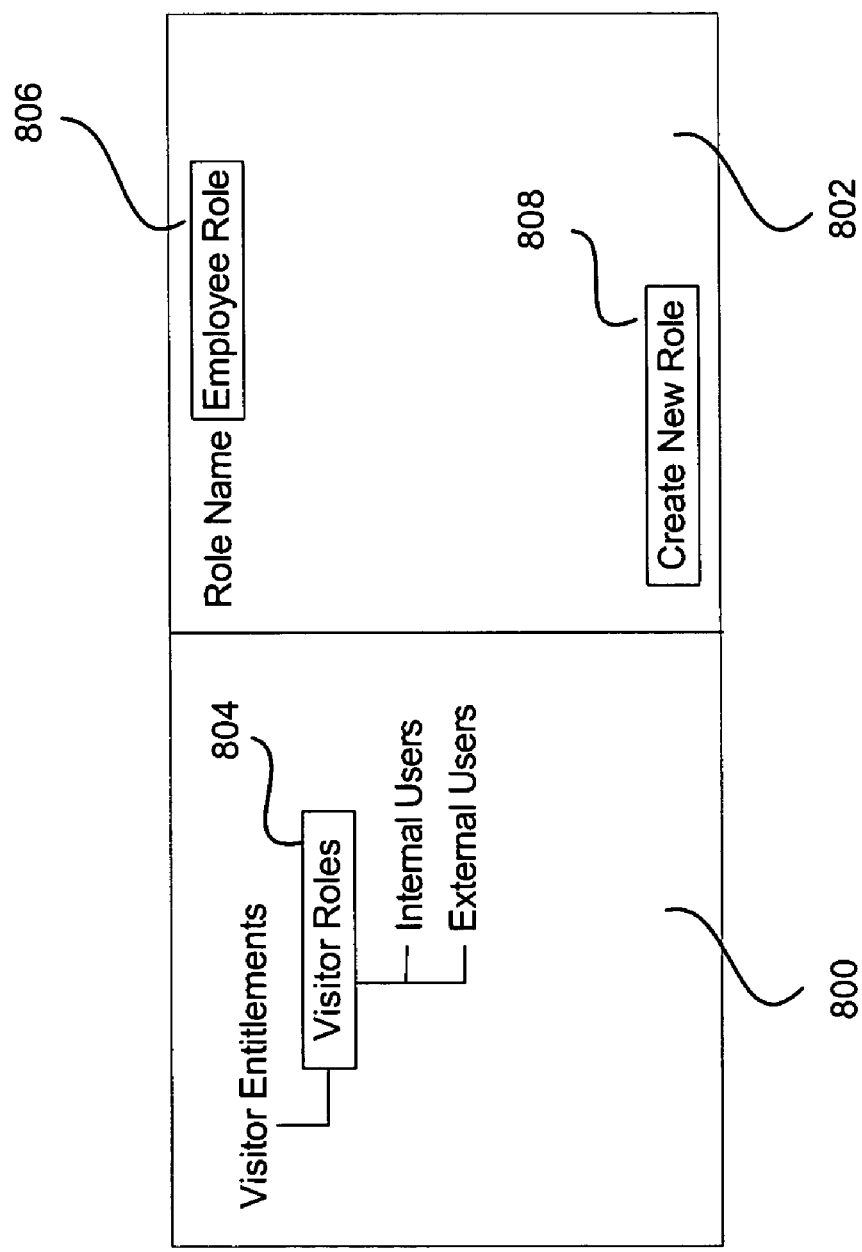
FIG. 8 is an illustration of a user interface that can be used to create roles in an embodiment.

FIG. 8 is an illustration of a user interface that can be used to create roles in an embodiment. A role can be used as part of an entitlement definition. Optional hierarchy browser 800 illustrates a "Visitor Entitlements" tree that has one immediate child, "Visitor Roles". Beneath "Visitor Roles", there are two roles defined: "Internal Users" and "External Users". When "Visitor Roles" is selected (as indicated by the rectangle 804), editor pane 802 allows a user to create new roles by typing in a role name 806 and selecting a "Create New Role" button 808. The new role is then added the hierarchy as illustrated in FIG. 9.

Figure 9:
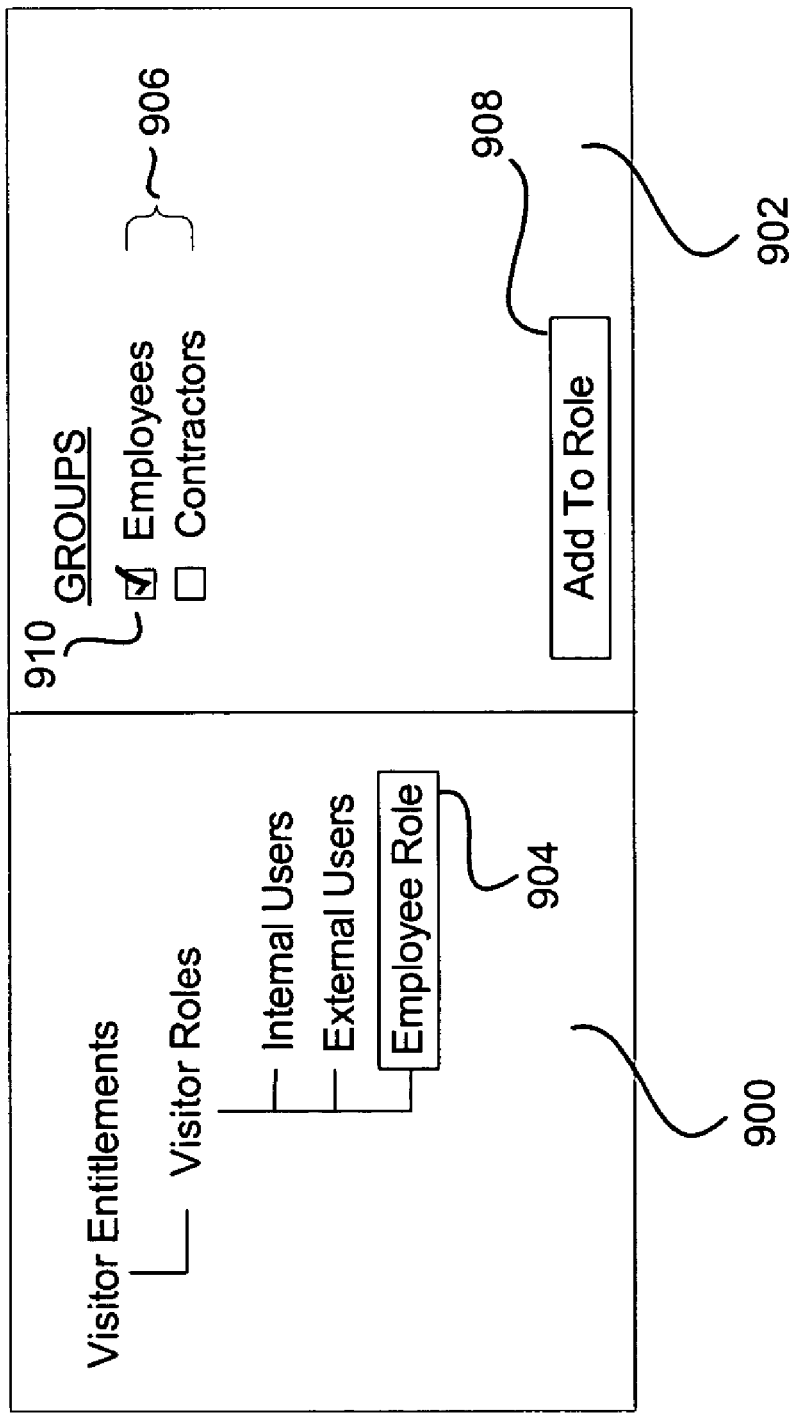
FIG. 9 is an illustration of a user interface that can be used to add groups to roles in an embodiment.

FIG. 9 is an illustration of a user interface that can be used to add groups to roles in an embodiment. Optional hierarchy browser 900 a "Visitor Entitlements" tree that has one immediate child, "Visitor Roles". Beneath "Visitor Roles", there are three roles defined: "Internal Users", "External Users" and "Employee Role". The role "Employee Role" is selected, as indicated by the surrounding rectangle 904. Context-sensitive editor 902 illustrates a role editor corresponding to the selected role. User groups 906 can be added to the role definition by selecting the desired roles 910 and selecting the "Add to Role" button 908.

Figure 10:
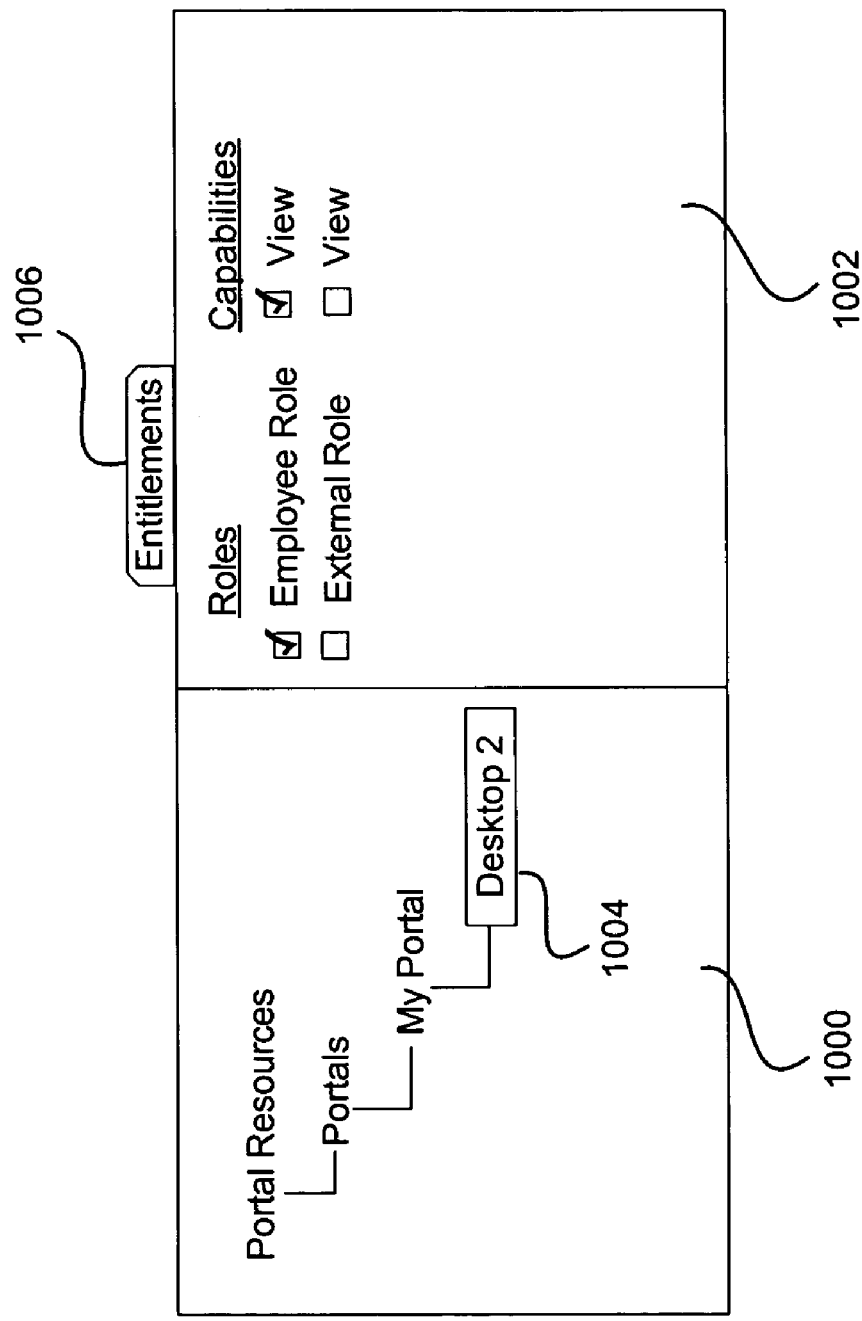
FIG. 10 is an illustration of a user interface that can be used to entitle a desktop in an embodiment.

FIG. 10 is an illustration of a user interface that can be used to entitle a desktop in an embodiment. Optional hierarchy browser 1000 illustrates a "Portal Resources" tree that includes a "Portals" subtree which in turn includes a portal "My Portal". The portal "My Portal" includes a desktop "Desktop 2" which is selected, as indicated by the rectangle 1004. Context-sensitive editor 1002 allows modification of properties associated with "Desktop 2". In this example, the "Entitlements" tab 1006 has also been selected, therefore the context-sensitive editor for "Desktop 2" is tailored for editing entitlement information. A user can entitle roles with different capabilities for the selected desktop by selecting role(s) and associated properties (if any). By way of a non-limiting example, desktop capabilities can include the ability to view a desktop. Thus, visitors who belong to the groups embodied in the selected roles will be allowed to view the desktop. Here, visitors in the role of "Employee Role" will be able to view "Desktop 2" whereas those in "External Role" will not.

Figure 11:
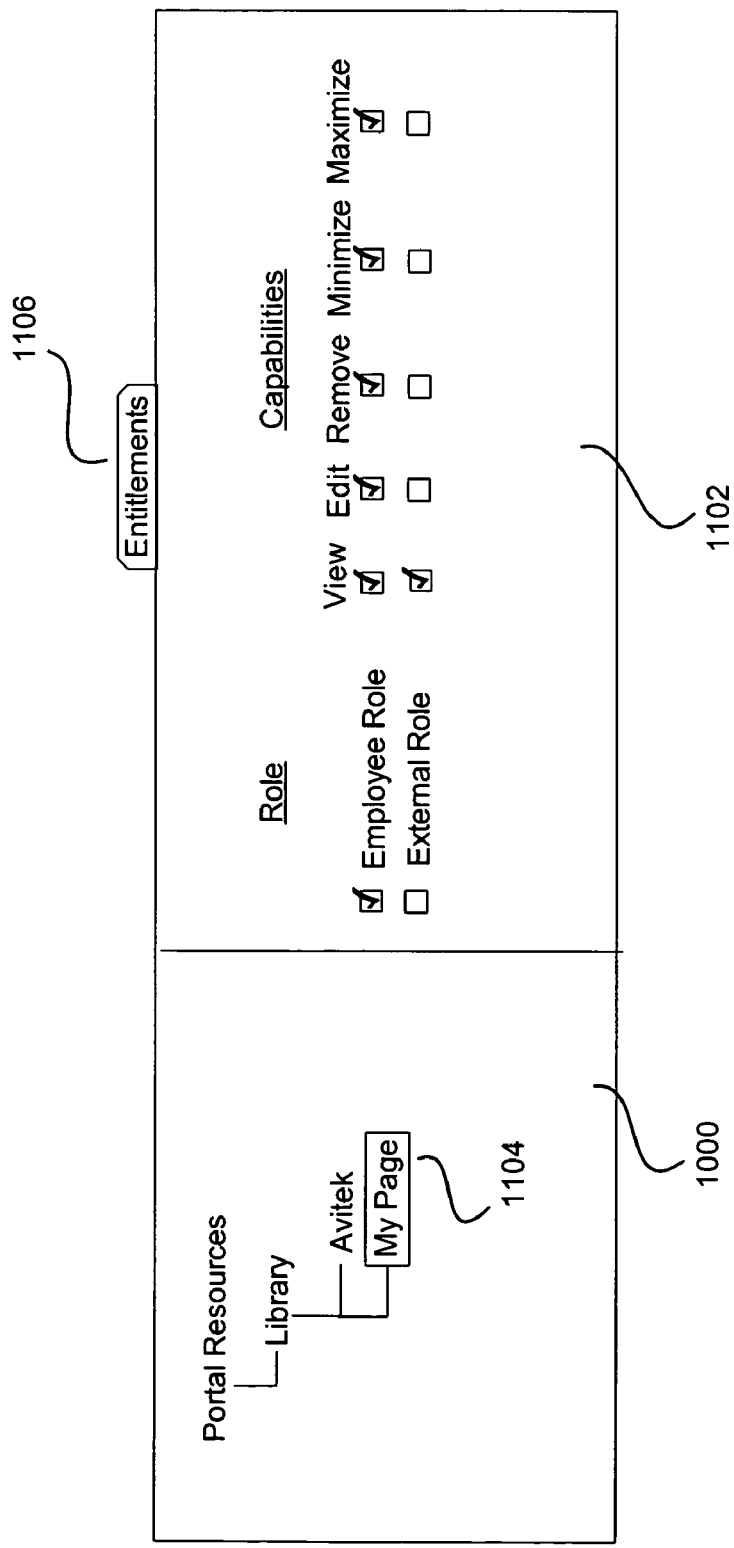
FIG. 11 is an illustration of a user interface that can be used to entitle a page in an embodiment.

FIG. 11 is an illustration of a user interface that can be used to entitle a page in an embodiment. Optional hierarchy browser 1100 illustrates a "Portal Resources" tree that includes a "Library" subtree which in turn includes a "Pages" subtree. The "Pages" subtree includes two pages: "Avitek" and "My Page" which is selected, as indicated by the rectangle 1104. Context-sensitive editor 1102 allows modification of properties associated with "My Page". In this example, the "Entitlements" tab 1106 has also been selected, therefore the context-sensitive editor for "My Page" is tailored for editing entitlement information. A user can entitle roles with different capabilities for the selected page by selecting the role(s) and associated properties (if any). By way of a non-limiting example, page capabilities can include the ability to view a page, the ability to edit information accessible through a page, the ability to rename page resources, and the ability to minimize or maximize portlet windows on the page. Here, visitors in the role of "Employee Role" have the ability to view, edit, rename, minimize and maximize. Whereas visitors in the "External Role" can only view the page. Other portal resources/components can be entitled in a similar fashion to desktops and pages.

Content management enables a user to integrate, manage, and personalize content in a portal environment. Content is a key component of any portal. Content can be defined as unstructured or semi-structured data. A common example is an image file and associated metadata; for example, date created, date modified, author, and subject. In Admin tool, a content type defines the shape of a content item. A content type can be any combination of binary, integer, calendar, string, Boolean, and properties. Interaction Management personalizes the delivery of content based upon these non-binary properties. Content can be organized into a content hierarchy. The top-level node is defined as a Virtual Content Repository. Under the Virtual Content Repository, you can plug in multiple, heterogeneous content repositories. This task is based on a single instance of the native BEA repository. Repositories can contain multiple hierarchy and content nodes. Hierarchy nodes function primarily as organizational units while content nodes function primarily as content items. Hierarchy nodes can be nested within each other infinitely. Content nodes are contained with hierarchy nodes and/or within the repository itself.

The system allows the content hierarchy to be reorganized and allows content properties to be edited. Users can add hierarchy nodes and content nodes. In one embodiment, nodes can be added in two different ways: through use of a batch loading utility or via a user interface. The following related U.S. patent application which is included herein in its entirety by reference includes information pertaining to batch loading a virtual content repository: CONTENT MINING FOR VIRTUAL CONTENT REPOSITORIES, U.S. application Ser. No. 10/772,625, Inventors: Gregory Smith, et al., filed on Feb. 5, 2004.

Figure 12:
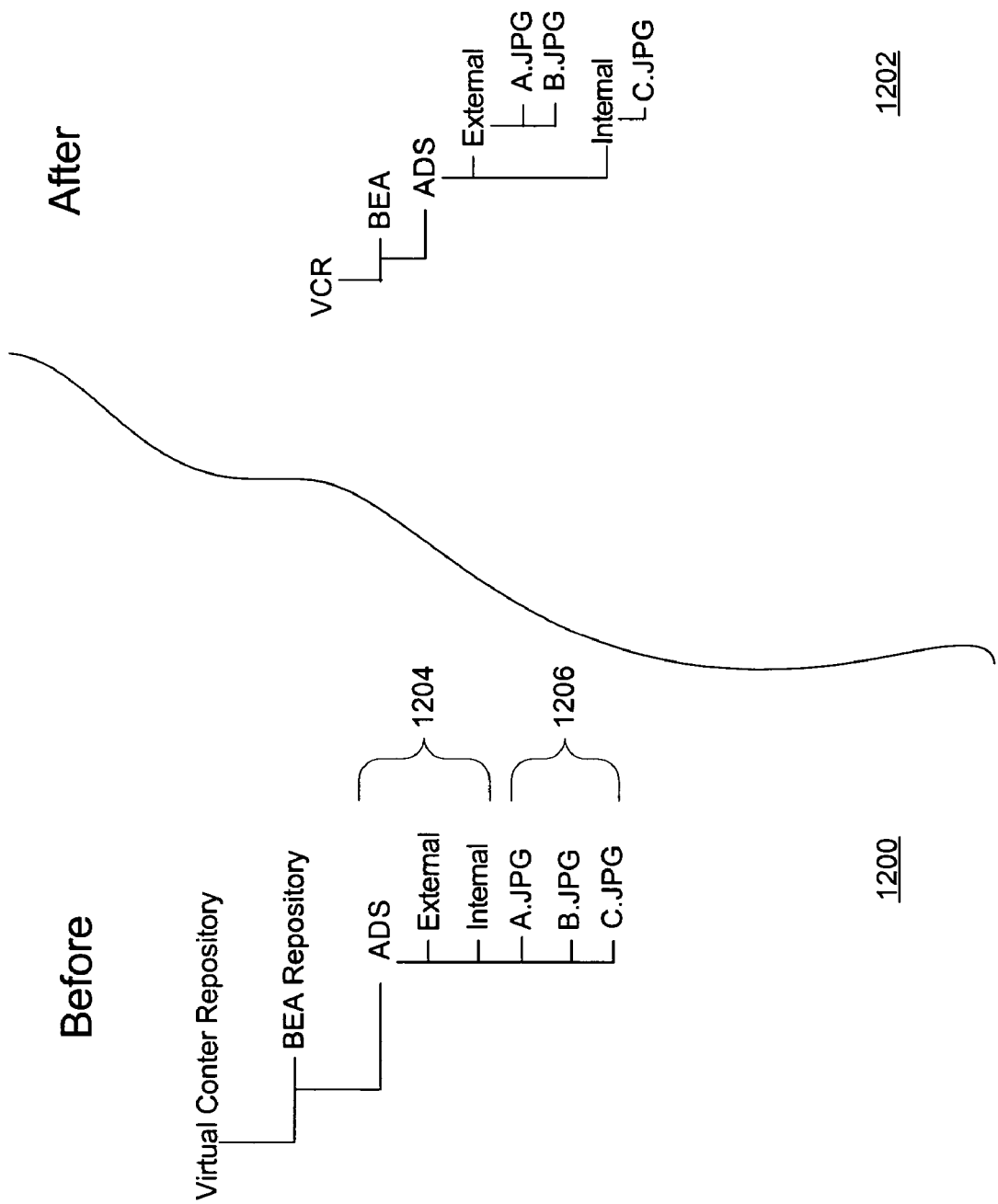
FIG. 12 presents two exemplary views of a user interface that can be used to manipulate a virtual content repository in one embodiment.

FIG. 12 presents two exemplary views of a user interface that can be used to manipulate a virtual content repository in one embodiment. In one embodiment, there are hierarchy nodes 1204 and content nodes 1206. A user can add either kind of node to the hierarchy by right-clicking on a node and selecting "Add Node" from a pop-up menu (not shown). Nodes can be moved by dragging and dropping them. Nodes can be renamed by right-clicking and selecting "Rename" from a pop-up menu (not shown). Nodes can deleted by right-clicking a node and selecting "Delete" from a pop-up menu (not shown). View 1200 shows a hierarchy before being manipulated. View 1202 shows the same hierarchy being manipulated: content nodes "a.jpg" and "b.jpg" were dragged and dropped into the "External" hierarchy node; and content node "c.jpg" was dragged and dropped into "Internal" hierarchy node.

Personalization provides a way to deliver content to Web site visitors based upon various criteria. This includes information about the user (user profile), the users current session, the request made by the user, and other data. A personalized site provides the visitor with a better experience because the content displayed can be targeted to their interests. One way to deliver personalized content is via a Placeholder, which in one embodiment is comprised of a JSP tag and a definition. The JSP tag is used by a developer on a portlet JSP, and it refers to the Placeholder definition which contains the rules that determine which content to display. To tailor the content delivered in a Placeholder for specific users, a User Segment can be created and used in personalization definitions. User Segments provide dynamic classification of users based on various criteria. For applications where more than one content item is to be displayed, or where non-image data is to be displayed, Content Selectors are provided. These are similar to Placeholders in that they have a definition managed by the administrators. But Content Selectors differ from Placeholders in the way that a developer can use them.

Figure 13:
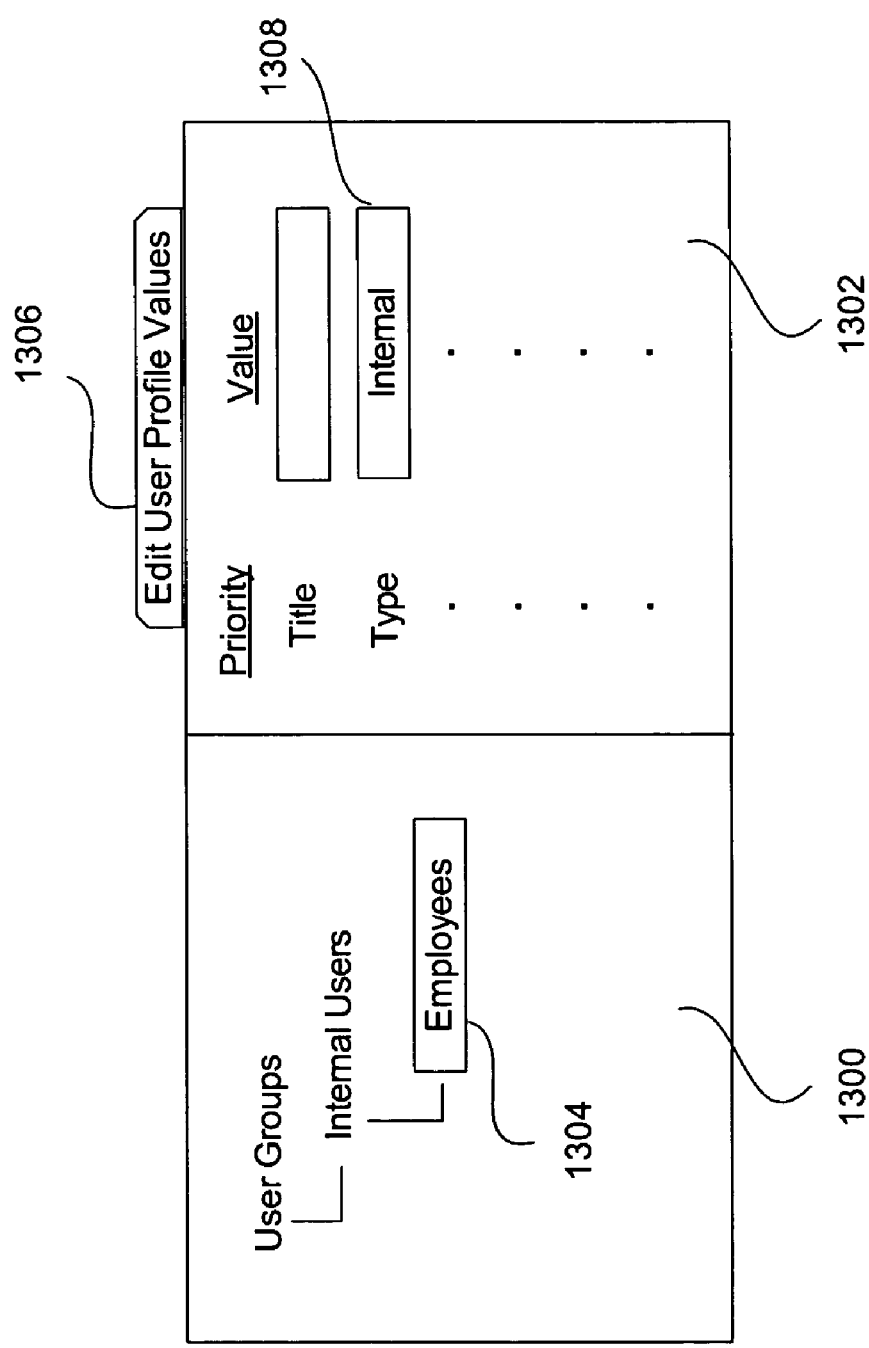
FIG. 13 is an illustration of a user interface that can be used to modify a user profile in an embodiment.

FIG. 13 is an illustration of a user interface that can be used to modify a user profile in an embodiment. Optional hierarchy browser 1300 presents a view of a "User Groups" tree that has one immediate child (although there could be many more), the group "Internal Users". This group has one member, the group "Employees" which is currently selected 1304. By selecting tab 1306, a context-sensitive editor 1302 for the selected group is rendered. The editor allows the properties associated with a user (i.e., the user profile), to be modified. Although any property can be associated with a user, in this example there are two apparent: "Title" and "Type". Title currently has no value since its associated value is empty. Whereas the Type has a value of "Internal" 1308. Properties can be added, deleted and their values changed by the editor.

Figure 14:
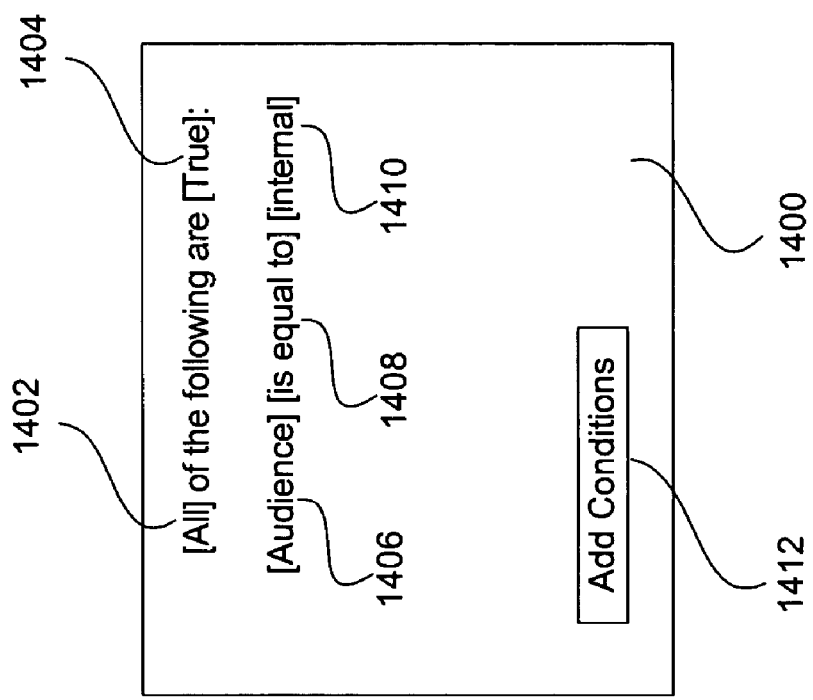
FIG. 14 is an illustration of a user interface that can be used to modify a placeholder definition in an embodiment.

FIG. 14 is an illustration of a user interface that can be used to modify a placeholder definition in an embodiment. Context-sensitive editor 1400 allows placeholder rules to be defined and edited for a given placeholder. Placeholder rules determine which content a placeholder will display on a portal page. A rule contains natural language phrases some of which are highlighted (e.g., in square brackets, underlined, etc.). A user can change highlighted phrases by selecting them. Highlighted phrases can be changed to new values that are appropriate for a given phrase's semantic attributes. In this non-limiting example, the rule includes a preamble that states: "[All] of the following are [true]:". This means that all of the following phrases must be true in order for the rule to be evaluated to true. If the rule evaluates to true for a given content, then the content can be displayed by the placeholder.

A user can change the highlighted phrase "All" to "Any" such that a logical OR is performed on the rule phrases rather than a logical AND. Likewise, "True" can be changed to "False" to reverse the logic of the rule.

A rule includes one or more phrases. In one embodiment, a rule phrase is in the form <property> <relationship> <value>, where <property> is a property defined on a virtual repository content node, <relationship> is a comparator (e.g., is less than, is greater than, is equal to, is not equal to, etc.) and <value> is the value of a given <property>. In this example, there is a single phrase: "[audience] [is equal to] [internal]". Each of these highlighted phrases can be changed by a user. The property phrase can be changed to be that of any property associated with content. Likewise, the value and relationship phrases can also be changed. Here, the audience property must be equal to "internal" in order for the rule to evaluate to true.

Figure 15:
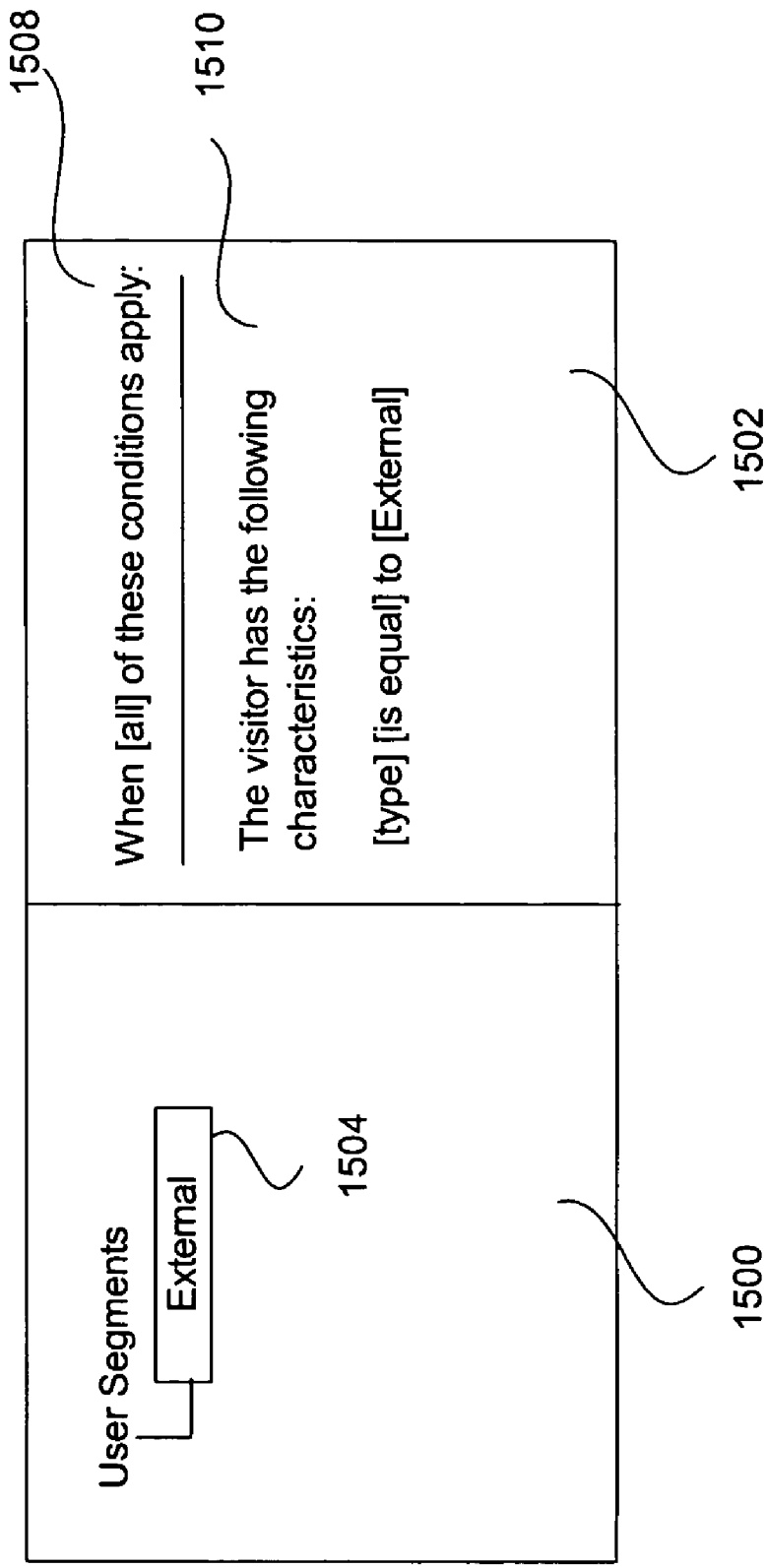
FIG. 15 is an illustration of a user interface that can be used to create and modify user segment definitions in an embodiment.

FIG. 15 is an illustration of a user interface that can be used to create and modify user segment definitions in an embodiment. Optional hierarchy browser 1500 can display a "User Segments" hierarchy. In this example, the segment "External" is selected, as indicated by the rectangle 1504. Context-sensitive editor 1502 contains the user segment definition. The user segment definition can include natural language phrases some of which are highlighted (e.g., in square brackets, underlined, etc.). A user can change highlighted phrases by selecting them. Highlighted phrases can be changed to new values that are appropriate for a given phrase's semantic attributes. In this non-limiting example, the rule includes a preamble that states: "When [all] of these conditions apply:". This means that all of the following phrases must be true in order for the rule to be evaluated to true. If the rule evaluates to true for a given portal visitor, then the visitor is considered a member of the user segment. The highlighted phrase "All" can be changed to "Any" such that a logical OR is performed on the rule phrases rather than a logical AND. Likewise, "True" can be changed to "False" to reverse the logic of the rule.

A rule includes one or more rule phrases. In one embodiment, a rule phrase is in the form <property> <relationship> <value>, where <property> is a property defined for a user profile, <relationship> is a comparator (e.g., is less than, is greater than, is equal to, is not equal to, etc.) and <value> is the value of a given <property>. In this example, there is a single phrase: "[type] [is equal to] [External]". Each of these highlighted phrases can be changed by a user. The property phrase can be changed to be that of any property associated with content. Likewise, the value and relationship phrases can also be changed. Here, the user type property must be equal to "External" in order for the rule to evaluate to true.

Figure 16:
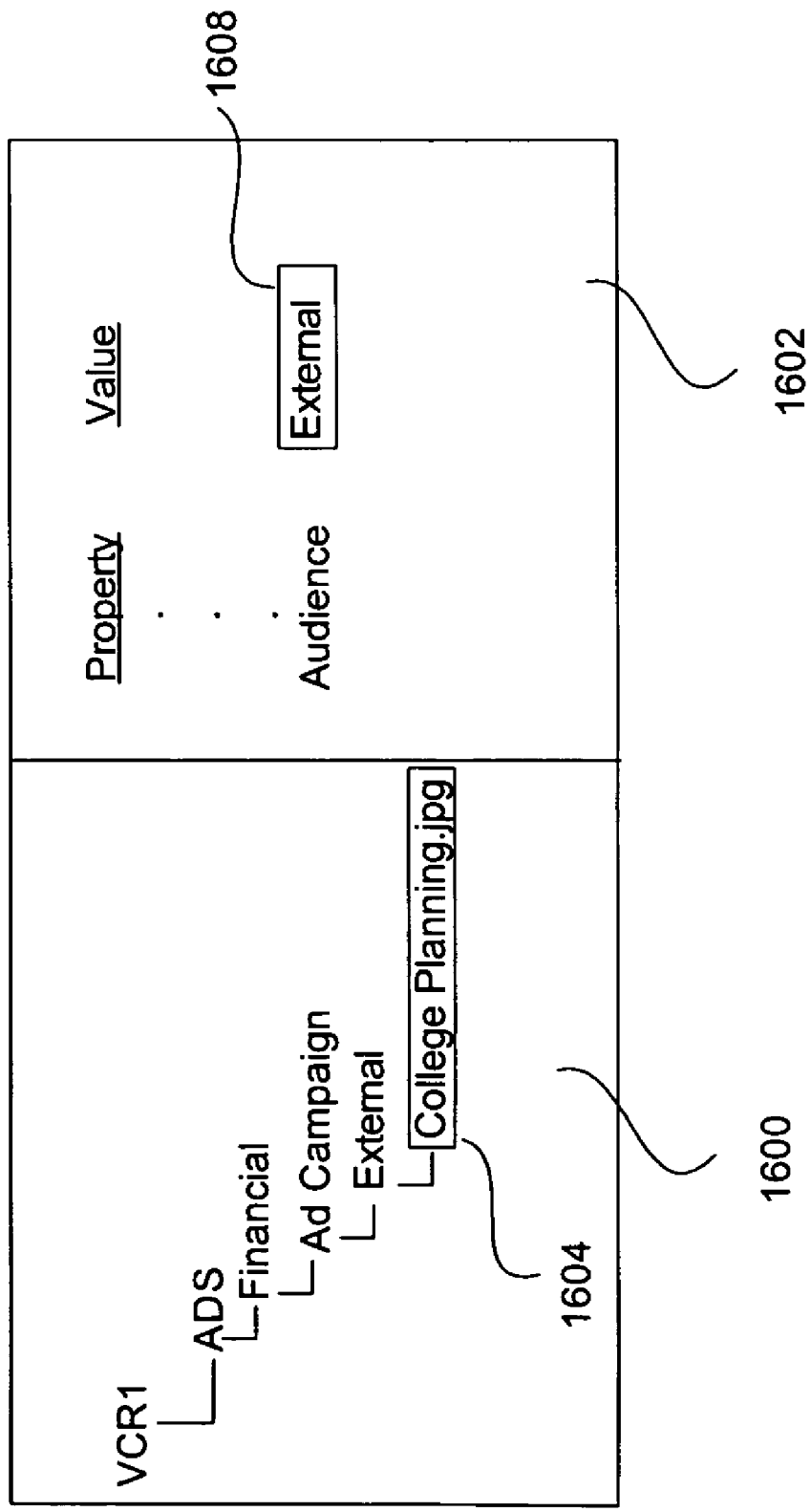
FIG. 16 is an illustration of a user interface that can be used to create and modify properties associated with content in an embodiment.

FIG. 16 is an illustration of a user interface that can be used to create and modify properties associated with content in an embodiment. Optional hierarchy browser 1600 displays a virtual content repository hierarchy that has a root of "VCR1". Beneath VCR1 is a repository "Ads". Ads contains hierarchy node "Financial", which contains hierarchy node "Ad Campaign", which contains hierarchy node "External". The External node contains content node "collegeplanning.jpg" which has been selected, as indicated by the rectangle 1604. This node could be an image used to advertise college planning services. When selected, its properties become editable in context sensitive editor 1602. The editor allows properties to be added and removed from the selected content node. In addition, property values can be changed. Here, the property "Audience" has a value of "External" which can be modified (e.g., by typing in field 1608).

Figure 17:
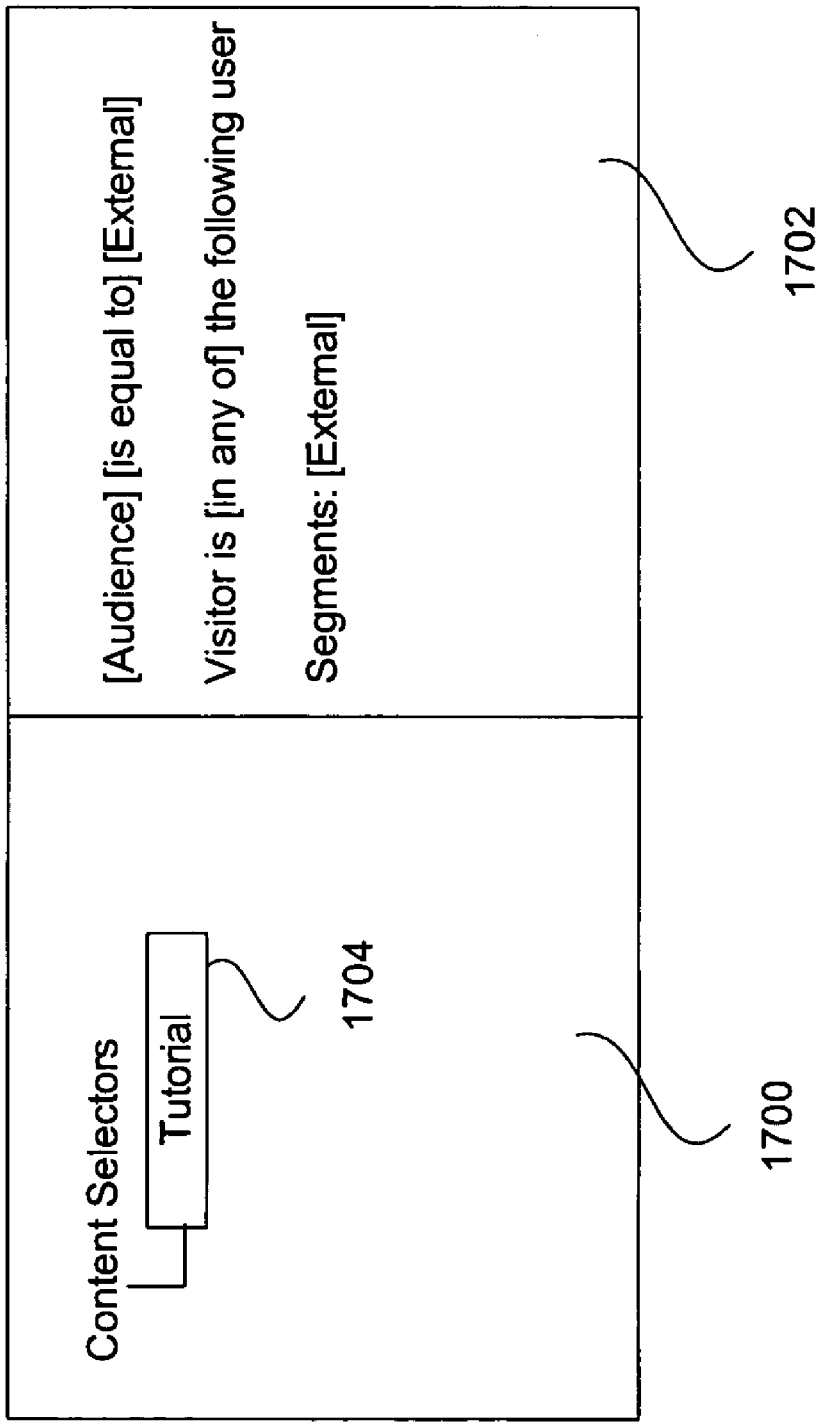
FIG. 17 is an illustration of a user interface that can be used to create and edit content selectors in an embodiment.

Dynamic personalization is fundamentally tied to the evaluation of rules based on a variety of properties. Content selectors can cause different content to be displayed in the a portlet based on dynamic evaluation of personalization rules. FIG. 17 is an illustration of a user interface that can be used to create and edit content selectors in an embodiment. Optional hierarchy browser 1700 can display a "Content Selectors" hierarchy. In this example, the content selector "tutorial" is selected, as indicated by the rectangle 1704. Context-sensitive editor 1702 contains the rule definition of the selected content selector. The content selector definition can include natural language phrases some of which are highlighted (e.g., in square brackets, underlined, etc.). A user can change highlighted phrases by selecting them. Highlighted phrases can be changed to new values that are appropriate for a given phrase's semantic attributes. In this non-limiting example, the rule includes a preamble that states: "[All] of the following are [true]". This means that all of the following phrases must be true in order for the rule to be evaluated to true in order for content to be rendered in a portlet. The highlighted phrase "All" can be changed to "Any" such that a logical OR is performed on the rule phrases rather than a logical AND. Likewise, "True" can be changed to "False" to reverse the logic of the rule.

A rule includes one or more rule phrases. In this example, there are two rule phrases. The first phrase is "[Audience] [is equal to] [External]". The rule requires that the audience property of any content to be displayed in a portlet that uses this content selector have its audience property equal to External. As discussed previously, each highlighted phrase can be selected and changed by the user. In addition, the user can add additional rule phrases. The second rule phrase is: "Visitor [is in any of the following user segments] [External, Internal]". This rule requires that a portal visitor belong to either the External or Internal user segment definitions. Each of these highlighted phrases can be changed by a user. The middle phrase can be changed to alter the relationship between Visitor and the value phrase. The value phrase can be selected to change the user segments (e.g., add segments and/or remove segments). Thus, this content selector will only display content that has the audience property equal to External and only when a portal visitor belongs to the External or Internal user segments.

The Delegated Administration feature facilitates localized administration of particular portal resources by designated portal administrators. For example, administration capabilities can be separately created and maintained for a company's Human Resources and Accounts Payable departments. The portal resources (e.g. content or user groups) associated with these departments can be managed by particular administrators who are specified and empowered via the use of the Admin tool.

Figure 18:
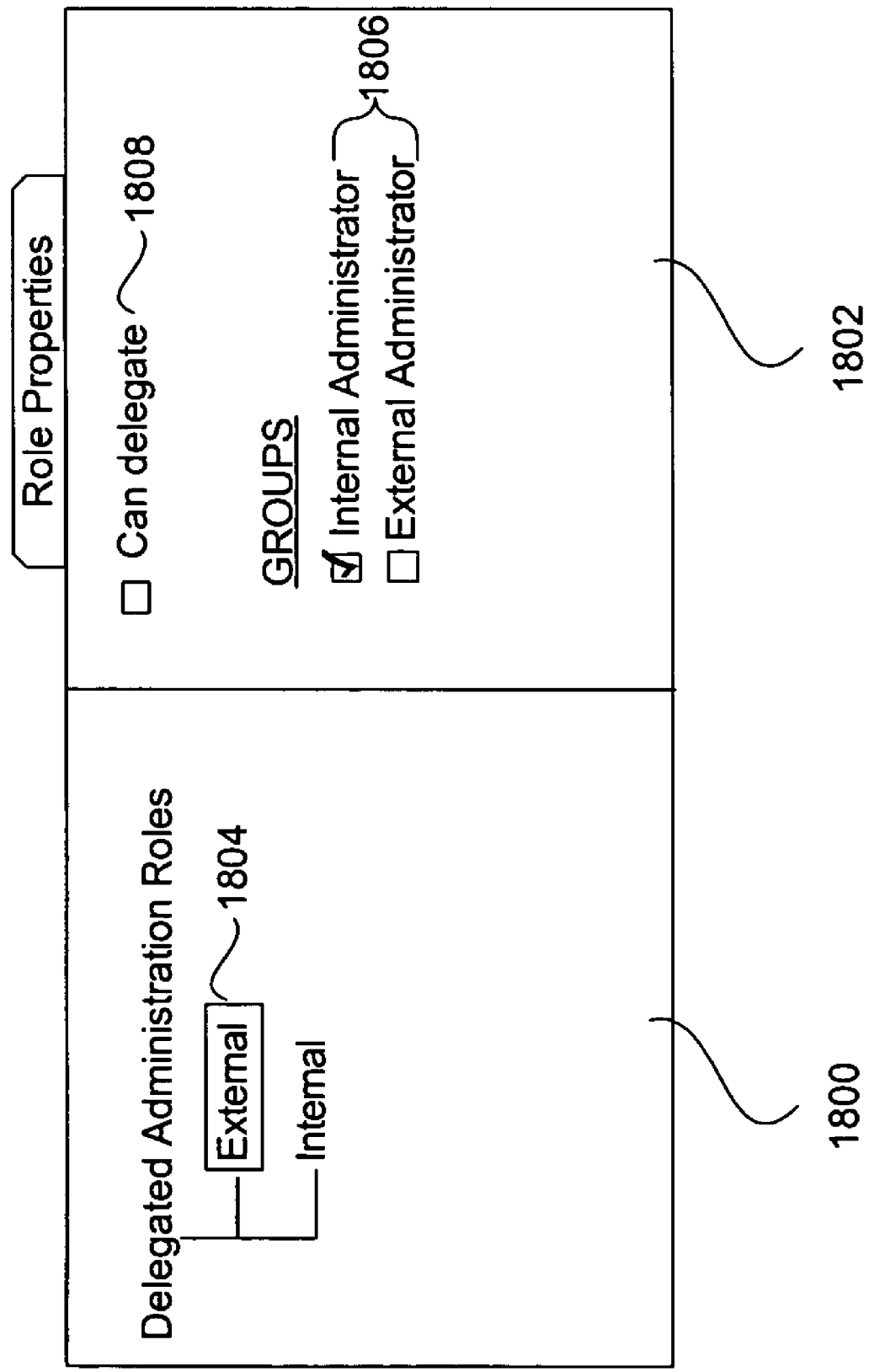
FIG. 18 is an illustration of a user interface that can be used to create delegated administration roles in an embodiment.

FIG. 18 is an illustration of a user interface that can be used to create delegated administration roles in an embodiment. Optional hierarchy browser 1800 displays a delegated administration role hierarchy. There are two such roles in this example: "External" and "Internal". The External role is selected as indicated by the surrounding rectangle 1804. Context-sensitive editor 1802 lists user groups 1806 available for inclusion in the selected delegated administration role. By selecting the check boxes adjacent to the user groups, said groups can be added to the definition of the delegated administration role. In addition, a user in a delegated administration role can further delegate management capabilities if the "Can Delegate" checkbox 1808 is selected.

In one embodiment, delegated administration roles can be empowered to manage portal resources/components (e.g., user profiles, group definitions, portals, desktops, pages, page layouts, roles, content repositories, placeholders, user segments and content selectors). Each of the prior resources/components can be provided with a user interface that allows delegated administration roles to be designated as having management capabilities over the given resource/component. Users who belong to a role can thus perform the management functions. Management capabilities vary depending on the resource, however, capabilities are generally include the ability to manage, create, read, update and/or delete. By way of a non-limiting example, if the resource is a content repository, the capabilities of a delegated administrator can include the ability to manage portions of the repository at and below specified hierarchy nodes.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented interactive tool that can configure a portal, comprising:
a microprocessor that is capable of running a plurality of user interfaces;
a first user interface, of the plurality of user interfaces, operable to manage the portal, wherein the portal contains at least one portlet to display one or more contents of a plurality of contents in a content repository;
a second user interface, of the plurality of user interfaces, operable to manage personalization of the portal, wherein the second user interface displays a content selector hierarchy that contains a plurality of content selectors, wherein the content selector hierarchy allows the at least one portlet to be associated with a selected content selector from the plurality of content selectors, and wherein each content selector of the plurality of content selectors, when selected, can cause different content to be displayed on the at least one portlet based on evaluation of personalization rules for each said content selector, wherein the personalization rules for each said content selector contain natural language phrases that are editable using a context-sensitive editor, wherein the context-sensitive editor allows a user to change any pre-selected highlighted phrase in the personalization rules, wherein at least one personalization rule for at least one said content selector contains two highlighted natural language phrases that can be changed by a user, wherein one said highlighted natural language phrase is a value phase that can be selected to change user segments, and wherein another said highlighted natural language phrase can be changed to alter the relationship between a visitor and the value phase.

2. The computer-implemented interactive tool of claim 1, wherein:
the first user interface operable to manage one of: a desktop, a book, a page, a shell, a look and feel, and a layout.

3. The computer-implemented interactive tool of claim 1 wherein:
the portal contains a desktop that can be defined based on a template.

4. The computer-implemented interactive tool of claim 1 wherein:
the portal contains a desktop that is a user-specific view of a portal.

5. The computer-implemented interactive tool of claim 1, further comprising:
a third user interface operable to manage a desktop; and
wherein the third user interface can render a preview of the desktop.

6. The computer-implemented interactive tool of claim 1 wherein:
the portal can be depicted graphically as a hierarchy of at least one portal resources.

7. The computer-implemented interactive tool of claim 1 wherein:
the first user interface includes a context-sensitive editor.

8. The computer-implemented interactive tool of claim 1 wherein:
the first user interface includes a hierarchy browser.

9. The computer-implemented interactive tool of claim 1, further comprising:
another user interface that manages visitor entitlement, wherein the visitor entitlement determines what capabilities are available to a portal visitor for at least one portal resource of the portal.

10. The computer-implemented interactive tool of claim 9, wherein:
the visitor entitlement is based on a user role.

11. The computer-implemented interactive tool of claim 1, further comprising:
a third user interface operable to manage content; and
wherein content is part of a virtual content repository (VCR).

12. The computer-implemented interactive tool of claim 11 wherein:
the third user interface allows a user to modify the VCR by dragging and dropping graphical objects representing VCR nodes.

13. The computer-implemented interactive tool of claim 1 wherein:
the at least one portlet can dynamically present content.

14. A method for configuring a portal, comprising:
providing a first user interface operable to manage the portal, wherein the portal contains at least one portlet to display one or more contents of a plurality of contents in a content repository;
providing a second user interface operable to manage personalization of the portal, wherein the second user interface displays a content selector hierarchy that contains a plurality of content selectors, wherein the content selector hierarchy allows the at least one portlet to be associated with a selected content selector from the plurality of content selectors, and wherein each content selector of the plurality of content selectors, when selected, can cause different content to be displayed on the at least one portlet based on evaluation of personalization rules for each said content selector, wherein the personalization rules for each said content selector contain natural language phrases that are editable using a context-sensitive editor, wherein the context-sensitive editor allows a user to change any pre-selected highlighted phrase in the personalization rules, wherein at least one personalization rule for at least one said content selector contains two highlighted natural language phrases that can be changed by a user, wherein one said highlighted natural language phrase is a value phase that can be selected to change user segments, and wherein another said highlighted natural language phrase can be changed to alter the relationship between a visitor and the value phase.

15. The method of claim 14, further comprising:
providing at least one user interface operable to manage one of: a desktop, a book, a page, a shell, a look and feel, and a layout.

16. The method of claim 14 wherein further comprising:
providing a desktop in the portal based on a template.

17. The method of claim 14 further comprising: providing a user-specific view of a portal for a desktop in the portal.

18. The method of claim 14, further comprising:
providing a third user interface operable to manage a desktop; and
wherein the third user interface can render a preview of the desktop.

19. The method of claim 14 further comprising:
depicting the portal graphically as a hierarchy of at least one resource.

20. The method of claim 14 wherein further comprising:
providing a context-sensitive editor in the first user interface.

21. The method of claim 14 wherein further comprising:
providing a hierarchy browser in the first user interface.

22. The method of claim 14, further comprising:
managing visitor entitlement, wherein the visitor entitlement determines what capabilities are available to a portal visitor for at least one resource.

23. The method of claim 15, further comprising:
basing the visitor entitlement on a user role.

24. The method of claim 14, further comprising:
providing a third user interface operable to manage content; and
wherein content is part of a virtual content repository (VCR).

25. The method of claim 24 further comprising:
allowing a user to modify the VCR by dragging and dropping graphical objects representing VCR nodes.

26. The method of claim 14 further comprising:
dynamically presenting content via a portlet in the portal.

27. A storage medium having instructions stored thereon that when executed by a processor cause a system to:
provide a first user interface operable to manage the portal, wherein the portal contains at least one portlet to display one or more content of a plurality of contents in a content repository;
provide a second user interface operable to manage personalization of the portal, wherein the second user interface displays a content selector hierarchy that contains a plurality of content selectors, wherein the content selector hierarchy allows the at least one portlet to be associated with a selected content selector from the plurality of content selectors, and wherein each content selector of the plurality of content selectors, when selected, can cause different content to be displayed on the at least one portlet based on dynamic evaluation of personalization rules, wherein the personalization rules for each said content selector contain natural language phrases that are editable using a context-sensitive editor, wherein the context-sensitive editor allows a user to change any pre-selected highlighted phrase in the personalization rules, wherein at least one personalization rule for at least one said content selector contains two highlighted natural language phrases that can be changed by a user, wherein one said highlighted natural language phrase is a value phase that can be selected to change user segments, and wherein another said highlighted natural language phrase can be changed to alter the relationship between a visitor and the value phase.

28. The storage medium of claim 27, further comprising instructions that when executed cause the system to:
at least one user interface operable to manage one of: a desktop, a book, a page, a shell, a look and feel, and a layout.

29. The storage medium of claim 27 wherein:
the portal contains a desktop that can be defined based on a template.

30. The storage medium of claim 27 wherein:
the portal contains a desktop that is a user-specific view of a portal.

31. The storage medium of claim 27, further comprising instructions that when executed cause the system to:
provide a third user interface operable to manage a desktop; and
wherein the third user interface can render a preview of the desktop.

32. The storage medium of claim 27 wherein:
the portal can be depicted graphically as a hierarchy of at least one resource.

33. The storage medium of claim 27 wherein:
the first user interface includes a context-sensitive editor.

34. The storage medium of claim 27 wherein:
the first user interface includes a hierarchy browser.

35. The storage medium of claim 27, further comprising instructions that when executed cause the system to:
manage visitor entitlement, wherein the visitor entitlement determines what capabilities are available to a portal visitor for at least one resource.

36. The storage medium of claim 35, further comprising instructions that when executed cause the system to:
base the entitlement on a user role.

37. The storage medium of claim 27, further comprising instructions that when executed cause the system to:
provide a third user interface operable to manage content; and
wherein content is part of a virtual content repository (VCR).

38. The storage medium of claim 37 further comprising instructions that when executed cause the system to:
allow a user to modify the VCR by dragging and dropping graphical objects representing VCR nodes.

39. The storage medium of claim 27 wherein:
dynamically presenting content via a portlet in the portal.

* * * * *